US005864871A

United States Patent [19]
Kitain et al.

[11] Patent Number: 5,864,871
[45] Date of Patent: Jan. 26, 1999

[54] INFORMATION DELIVERY SYSTEM AND METHOD INCLUDING ON-LINE ENTITLEMENTS

[75] Inventors: Eduard Kitain; Isaak Karaev, both of Brooklyn, N.Y.; John J. Mahoney, Princeton Junction; Mary Ellen McCarthy, Atlantic Highlands, both of N.J.; James M. Tousignant, Hartsdale, N.Y.; George Baird, New York, N.Y.; Paul Blazek, Forest Hills, N.Y.

[73] Assignee: Multex Systems, New York, N.Y.

[21] Appl. No.: 789,768

[22] Filed: Jan. 28, 1997

Related U.S. Application Data

[63] Continuation-in-part of Ser. No. 658,966, Jun. 4, 1996, and Ser. No. 739,377, Oct. 29, 1996.

[51] Int. Cl.⁶ .................................................. G06F 17/30
[52] U.S. Cl. .............................. 707/104; 707/10; 707/9
[58] Field of Search ................................. 707/104, 10, 9

[56] References Cited

U.S. PATENT DOCUMENTS

| | | |
|---|---|---|
| 5,089,956 | 2/1992 | MacPhail . |
| 5,247,661 | 9/1993 | Hager et al. . |
| 5,262,942 | 11/1993 | Earle . |
| 5,265,242 | 11/1993 | Fujisawa et al. . |
| 5,297,032 | 3/1994 | Trojan et al. . |
| 5,301,350 | 4/1994 | Rogan et al. . |
| 5,321,750 | 6/1994 | Nadan . |
| 5,333,246 | 7/1994 | Nagasaka . |
| 5,410,693 | 4/1995 | Yu et al. . |
| 5,502,637 | 3/1996 | Beaulieu et al. . |
| 5,511,156 | 4/1996 | Nagasaka . |
| 5,513,126 | 4/1996 | Harkins et al. . |
| 5,537,586 | 7/1996 | Amram et al. . |
| 5,539,865 | 7/1996 | Gentile . |

FOREIGN PATENT DOCUMENTS

| | | |
|---|---|---|
| 0 701 220 A1 | 3/1996 | European Pat. Off. . |
| WO 91/01608 | 2/1991 | WIPO . |
| WO 93/15466 | 8/1993 | WIPO . |
| WO 95/33236 | 12/1995 | WIPO . |

OTHER PUBLICATIONS

GFI News Release, 2pgs, Jun. 5, 1996, New York.
Inside Market Data, The Newsletter of Electronic Financial Information, 3 pgs.., Jun. 17, 1996, Waters Information Services, Inc.
Multex News release, Multex Systems, Inc. Doubles Its Private Capital Financing, 2 pgs., Jun. 5, 1996.
Multex News Release, Multex Systems, Inc. Aligns With Top Wall Street Information Providers, 2 pgs., Jun. 5, 1996.
SIA Report Market Pulse, Multex Raises Capital; Signs with Reuters, Bloomberg, GFI, Wall Street & Technology, 1 pg., Aug. 1996.

(List continued on next page.)

*Primary Examiner*—Wayne Amsbury
*Attorney, Agent, or Firm*—Kenyon & Kenyon

[57] ABSTRACT

An integrated computer-implemented corporate information delivery system. A database stores research reports produced by and received electronically from brokerage firms. The database also stores corporate information about a number of corporations. Each item of corporate information is produced by and received electronically from one of the corporations about that corporation. Authorization information ("entitlements") specifies who is authorized to access each research report or item of corporate information. An entitlement subsystem allows the contributor of the research report or item of corporate information to dynamically change, on-line, the entitlement status of any or all users/subscribers. A research delivery module allows a user to submit a query and receive query results listing research reports and corporate information satisfying the query and that the user is authorized to access. A corporate register module outputs corporate information, the corporate information output according to a common format. The corporate information may be distributed via the Internet.

23 Claims, 14 Drawing Sheets

OTHER PUBLICATIONS

Bloomberg–Multex Research, 2 pgs., Bloomberg Financial Markets Commodities News.

"Multex Publisher™", Multex Systems, Inc., copyright 1994, 6 pages.

"Multex Contributor User Guide", Multex Systems, Inc., 36 pages.

Gupta, Udayan, "From The Inside Out," *Information Week*, May 22, 1995 3 pages.

| | | | | | *Bulletin Board* 130 |
|---|---|---|---|---|---|
| Refresh | Query | Summary | AM Notes | View All | Long Form |
| 120 | 122 | 124 | 126 | 128 | |

Latest 100 of 143 Documents —132

| Submit | Company | Pgs | Size | Symbol | Syn | Headline |
|---|---|---|---|---|---|---|
| 10:41AM | Equitable Securities | 3 | 72K | | | Roper Industries |
| 10:39AM | Equitable Securities | 2 | 75K | | | Mid States PLC |
| 10:39AM | Equitable Securities | 3 | | | | Leggett & Platt |
| 10:37AM | Punk, Ziegel & Kn... | 1 | 51K | HPS | | HealthPlan Service |
| 10:36AM | Merrill Lynch | 2 | 17K | ASDOF | Yes | Assidoman: Strong |
| 10:35AM | Merrill Lynch | 2 | 12K | CNG | | CONSOL NAT GAS: A |
| 10:21AM | Merrill Lynch | 2 | 55K | | | Strategy Updates |
| 10:18AM | Merrill Lynch | 6 | 64K | | | Daily Optimized Tr |
| 10:18AM | ING Barings | 11 | | SKODA... | | Eastern Europe Da |
| 10:14AM | Merrill Lynch Test | | 35K | MLNONO | | CURRENT RESTRICTI |
| 10:14AM | Janney Montgomery... | 2 | | ADCO | | Adco Technologies |
| 10:14AM | Merrill Lynch Test | 1 | | MLNO24 | | 24-Hour Restricti |
| 10:14AM | Janney Montgomery... | 7 | 57K | | | Statistical Pages |
| 10:14AM | Janney Montgomery... | 86 | 469K | ANST M... | | Mid-Atlantic Revi |
| 10:04AM | Brown Brothers Ha... | 15 | 172K | CL HNZ... | | Colgate Palmolive |
| 10:02AM | Merrill Lynch | 2 | 52K | HNKDF | | HANKYU DEPT.: Lowe: |

| | | 120 | 122 | 124 | 126 | 128 | | 130 | |
|---|---|---|---|---|---|---|---|---|---|
| | | Refresh | Query | Summary | AM Notes | View All | | Long Form | |
| 404 — Latest 100 of 115 Documents, Sorted by Score, for Last 30 Days and ("strong b | | | | | | | | | |
| Scr | Release | Company | | Pgs | Size | Symbol | Syn | Headline | |
| 1 | Apr 22 | Alex Brown & Sons | | 3 | 132K | SUI | | SUN COMMUNITI | |
| 1 | Apr 22 | Alex Brown & Sons | | 4 | 89K | HRC | | HEALTHSOUTH C | |
| 1 | Apr 22 | Alex Brown & Sons | | 9 | 225K | IWBK | | INTERWEST BAN | |
| 1 | Apr 22 | Alex Brown & Sons | | 9 | 348K | MRK | | MERCK & CO. | |
| 1 | Apr 22 | Alex Brown & Sons | | 93 | 620K | ALTRA A... | | WEEKLY NOTES | |
| 1 | Apr 23 | Alex Brown & Sons | | 7 | 689K | DTOP | | DESKTOP DATA, | |
| 1 | Apr 23 | Alex Brown & Sons | | 5 | 126K | DELL | | DELL COMPUTER | |
| 1 | Apr 23 | Alex Brown & Sons | | 5 | 88K | GDT | | GUIDANT CORPO | |
| 1 | Apr 24 | Alex Brown & Sons | | 4 | 91K | HCR | | HEALTH CARE & | |
| 1 | Apr 24 | Alex Brown & Sons | | 8 | 345K | JNJ | | JOHNSON & JOHNSO | |
| 1 | Apr 24 | Alex Brown & Sons | | 4 | 81K | ATML | | ATMEL CORPORA | |
| 1 | Apr 24 | Alex Brown & Sons | | 6 | 94K | CSCC | | CASCADE COM | |
| 1 | Apr 25 | Alex Brown & Sons | | 9 | 187K | EVGM A... | | EVERGREEN MED | |
| 1 | Apr 25 | Alex Brown & Sons | | 10 | 281K | AMRD C... | | BROADCASTING: | |
| 1 | Apr 25 | Alex Brown & Sons | | 4 | 82K | MCSY. | | MEDIA COMPUTE | |
| 1 | Apr 25 | Alex Brown & Sons | | | 80K | ODR BE | | ALEX BROWN B | |

| | | | | | Bulletin Board 730 | |
|---|---|---|---|---|---|---|
| Refresh | Query | Summary | AM Notes | View All | Long Form | |
| Latest 100 of 143 Documents 732 | | | | | 735 | Corp. Register |

| Submit | Company | Pgs | Size | Symbol | | Syn | Headline |
|---|---|---|---|---|---|---|---|
| 10:41AM | Equitable Securities | 3 | 72K | | | | Roper Industries |
| 10:39AM | IBM | 2 | 72K | IBM | | | Press Release: Bette |
| 10:39AM | Equitable Securities | 3 | 75K | | | | Leggett & Platt |
| 10:37AM | Punk, Ziegel & Kn... | 1 | 51K | HPS | | | HealthPlan Service |
| 10:36AM | Microsoft Corp. | 2 | 17K | MSFC | | | Annual Report 1996 |
| 10:35AM | Merrill Lynch | 2 | 12K | CNG | | | CONSOL NAT GAS: A |
| 10:21AM | Merrill Lynch | 6 | 55K | | | | Strategy Updates |
| 10:18AM | INTEL | 6 | 64K | SKODA... | | Yes | 10-Q |
| 10:18AM | ING Barings | 11 | | MLNONO | | | Eastern Europe Da |
| 10:14AM | Merrill Lynch | 2 | 35K | ADCO | | | CURRENT RESTRICTI |
| 10:14AM | Janney Montgomery | 1 | | MLNO24 | | | Adco Technologies |
| 10:14AM | Merrill Lynch | 7 | 57K | | | | 24-Hour Restricti |
| 10:14AM | Janney Montgomery... | 86 | 469K | ANST M... | | | Statistical Pages |
| 10:14AM | Janney Montgomery... | 15 | 172K | CL HNZ... | | | Mid-Atlantic Revi |
| 10:04AM | Brown Brothers Ha... | 2 | 52K | HNKDF | | | Colgate-Palmolive |
| 10:02AM | Merrill Lynch | | | | | | HANKYU DEPT.: Lowe: |

FIG. 8

⊙ HOMEPAGE  ⊙ COMMENTS  ⊙ QUICK GUIDE

MultexNET Report Server

REPORTS —— 1010

ENTITLEMENTS —— 1020

Log In | Home | Feedback | Help
About Multex | Our Products | Our Contributers | Contact Multex | Sign Up For MultexNET "MultexNET", "Wired To Wall Street", and "Multex Publisher" are trademarks and servicemarks of Multex Systems, Inc.

All material and images on the pages within this site are Copyright 1995 Multex Systems, Inc.

All data and reports found at this site are the copyrighted material of the original contributors and may not be redistributed or modified without their permission

FIG. 10

Entitlements for Multex Systems, Inc.

Select the document group to entitle: [Multex Tech Doc]  1110

All subscribers for the [ ] days per letter
Default is all days  1120

1130

All Subscribers for last
1140 — | 16 Days | 30 Days | 60 Days | — 1160
1150

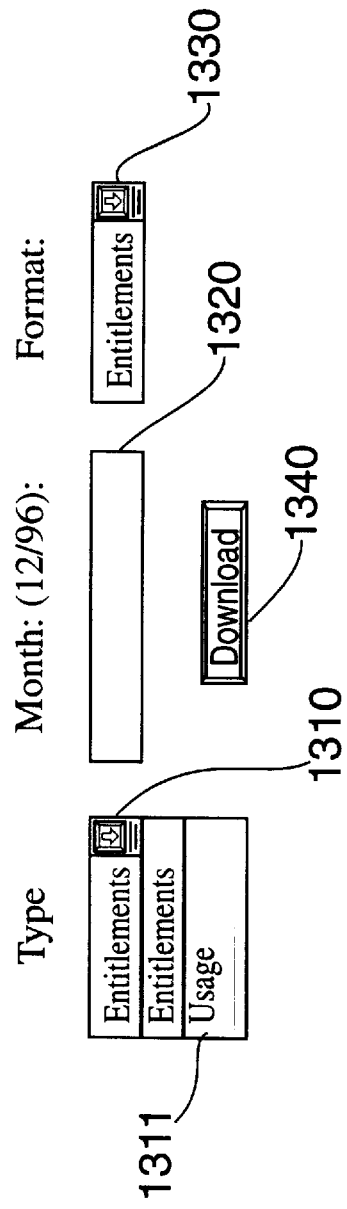

INFORMATION DELIVERY SYSTEM AND METHOD INCLUDING ON-LINE ENTITLEMENTS

RELATED APPLICATIONS

This application is a continuation-in-part of U.S. patent application, Ser. No. 08/658,966, filed Jun. 4, 1996 now pending, and a continuation-in-part of U.S., patent application, Ser. No. 08/739,377, filed Oct. 29, 1996 now pending.

FIELD OF INVENTION

The present invention is directed to a computer-based system and method for the electronic distribution of information, and more particularly, for the distribution of information via the Internet to authorized (entitled) recipients.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Brokerage and investment banking firms spend large sums of money creating, printing and distributing thousands of graphic-rich research reports to investors (e.g., customer's, remote sales offices, investment advisors, brokers, portfolio managers, etc.). Firms seeking to reduce costs may consider distributing these reports electronically, from computer to computer. Electronic distribution is generally cost effective when compared with hard copy distribution methods. Global computer networks, such as the Internet, enable information to be distributed to a wide range of people at locations around the world. One of the many advantages of the Internet, particularly the World Wide Web ("WWW"), is that the communication protocols used are non-proprietary, thus enabling end users to access and use the Internet without the need for customized hardware or software.

Often, brokerage and investment banking firms wish to provide information to investors or users on a controlled basis. For example, the firms may want to provide information only to those users who have paid a fee or completed a registration process, and also may want to dynamically restrict access to certain types of information to certain classes of users. Additionally, the firms may require that the format of the information provided to one user be different from the format of the same information provided to another user or class of users.

Further, some investors may be interested only in certain types of information available from a firm. Investors may wish that the information received from an firm be output in a format specific to that investor.

Existing technology allows an information provider such as a brokerage or investment banking firm who distributes information via the WWW to restrict access to authorized users or investors by means of, for example, a user identification code and/or password. However, current password authorization methods used on the WWW have a number of significant problems. When using a browser program, such as Netscape's Navigator program or Microsoft's Internet Explorer program, to access web pages, a user is simply making a request to a remote web server (having a unique IP address) for a file. This file is stored in the user's computer local memory and is output by the browser program. Typically, web pages are in HTML format (HyperText Markup Language). Each time the user "moves" to a new web page, the browser program makes a new request to a web server (which may be the same or another web server) for a file. Thus, although a user may provide a password to obtain a file from a web server, the user typically does not log-out when the user has finished with this file—the user simply issues a request for a file on another web server or closes down his or her browser program.

When a user initially accesses a web server, most browser programs can provide the web server with an identification code identifying the particular browser as well as the user's Internet Protocol ("IP") address. However, when a user accesses a web server through a proxy server, many users may appear to have the same IP address.

To prevent concurrent use of a user's identification code and password (e.g., to prevent the user from distributing the user's identification code and password for use by others) when a user initially accesses a web server, the web server, using current password technology, can prevent other access with that identification code for a predetermined period of time. However, if the user moves to another computer or browser program, then the authorized user will be prevented from accessing the web server from the new computer or browser program.

Thus, a secure sign-on procedure is needed that prevents multiple users using the same identification code and allows an authorized user to move to another computer or browser program and still be permitted to access the secure web server.

When providing information via the WWW, information providers can, in a crude way, "customize" the information for a user. One simple example of customization is providing the user with the results of a query. Here, the user submits a query to the web server, e.g., by completing a form, and, based on the user's request, the web server creates a web page (or form) comprising information satisfying the query and transfers this web page (or form) to the user's browser program for display. In such systems, the program used to create the web page (or form) is "hard coded", so that if the information provider wishes to change the format of the information, this program must be recoded or replaced. Recoding or replacing such programs is inefficient and often time consuming.

Further, every user who submits the same query to the web server will receive the same results in the same format. Existing methods of providing information to WWW users do not enable different users to be automatically provided with different views of the information. Thus, a procedure is needed to enable the provision of customized views of requested information to WWW users.

When a user submits a query to a web server, the web server will typically format and submit the received query to a database program or search engine. There can be many types of queries that a user submits via an information provider's web server. For example, some queries may request information based on categories contained in a relational database (e.g., all presidents who were born in Virginia) while other queries may require full text searches of textual documents (e.g., all documents containing the words "sell" and "IBM"). Currently, information providers maintain one database of information that is used to obtain the results of all types of queries. However, while a database search engine may be fast and efficient in obtaining search results for some types of queries, it may be slow and inefficient in obtaining search results for other types of queries.

Moreover, when responding to queries via the WWW, the web server is accessed by many users. Due to communication delays over the Internet, it is wasteful to tie-up the database program or search engine until each user has received the full results of the user's query. It would be desirable in some instances to provide a search mechanism that allows asynchronous searching of a database by multiple web users such that the database program or search engine can take advantage of communication delays when serving multiple users.

Thus, in summary, an Internet information delivery system is needed that has a secure but flexible password control mechanism so that information is provided only to users who are authorized to receive it, that efficiently retrieves any requested information, and that customizes the views of information provided to users in a flexible and robust manner.

Additionally, corporations spend large sums of money creating, printing and distributing their annual reports (and other financial/investment documents) to shareholders and investment advisors. An annual report presents the corporation's view of its financial performance, and, in its presentation and format, often makes a statement about the style, direction and philosophy of the corporation. However, many recipients of these reports do not spend much time reading them. Further, an investor, analyst or investment advisor, when reviewing a corporation's performance, may not have the most recent annual report of the corporation readily available. It would be beneficial (for both the corporation and the investor) if the annual report produced by a corporation could be made available to those interested at the time of that interest.

Corporations also spend large sums of money on investor relations programs in order to, for example: be viewed as a first tier, quality stock and sound investment vehicle; seek a fair valuation for the price of the corporation's stock; reduce volatility by providing guidance to investors and attracting long-term investors; make the corporation's business more understandable; reinforce sales, marketing and product messages; and interpret and explain corporate philosophy, all so that investors will maintain and add to their investment in the corporation.

Corporations often wish to distribute to interested parties other corporate information, such as, for example, 10-K and 10-Q statements, press releases, quarterly faxes to analysts, etc. A corporation may wish to distribute this information generally or to a select audience.

Employees of brokerage and investment banking firms often have access to electronic document delivery systems, such as the Multex Publisher™ Research Viewer program, by Multex Systems, Inc. of New York, N.Y. or the Bloomberg-Multex Research system. Bloomberg-Multex Research, for example, is a real-time global research service that allows major brokerage firms to distribute publication-quality research information to their institutional clients including portfolio managers, analysts and traders. Information that is distributed on such systems include recommendation changes, morning notes, report headlines and full length research reports. This information is produced by brokerage firms and is distributed in a page description format reflecting the layout of the corresponding printed research report. It would be beneficial if investors, portfolio managers, investment brokers and traders could also access, at a single site, using a single integrated system, the wide array of information that is produced by the subject corporations themselves, such as, for example, annual reports, as well as profiles designed to highlight those features of a corporation and its strategy that are of particular relevance to investors.

When investors, portfolio managers and traders search electronic databases of research reports produced by brokerage firms, it would be also useful to search (and return as part of the search results) the text of corporation's annual reports, Internet web sites and other corporate-produced documents. This would provide the investors, portfolio managers and traders with additional information that would be useful in making investment decisions and recommendations.

Unfortunately, existing databases systems used by investors and analysts provide limited information. Research distribution systems include research reports but not corporate web sites or annual reports, the EDGAR database includes 10-K and 10-Q filings but not brokerage firms research reports or corporate web sites, Internet search engines search web sites and some public databases but not brokerage firms research reports or most corporation's annual reports. The complex and time consuming search process needed to gather all of this diverse information is incompatible with investors' need for rapid, easy access to time sensitive data.

Thus, there exists a need for an integrated information delivery system that meets the needs both of corporations (to have annual reports and other corporate information delivered to interested investors, advisors and analysts) and of investors (to quickly access a wide variety of sources when researching a corporation).

Some corporations take advantage of current Internet technology and make their annual reports available on the WWW for access by the public. However, it is often difficult to locate such annual reports (if any) in a corporation's web site. Further, the annual reports of each corporation are presented on the WWW in a variety of formats (e.g., different frames, page layouts, hyperlink navigation maps, etc.) making it difficult for the investment community to quickly and efficiently conduct research.

Often, like brokerage and investment banking firms, a corporation wishes to provide information on a controlled basis. For example, the corporation may want to provide information (e.g., detailed financial data or specialized product information) only to shareholders or to certain analysts. Additionally, the corporation may require that the format of the information provided to one person be different from the format of the same information provided to another person or class.

Further, some users of the information only may be interested in certain types of information available from a particular corporation.

Thus, there exists a need for a system for the electronic distribution of corporate information to those who a permitted (i.e., entitled) to have access to and wish to access the information.

When a corporation distributes corporate information (e.g., an annual report), it would be useful if the corporation was provided with information as to whether investors read and found the report useful. However, potential investors may not wish that third parties track the subject of their investment research. Accordingly, there is a need for a system that provides feedback to corporations as to use of their corporate information without disclosure of activities that may be regarded by investors as confidential.

SUMMARY OF THE INVENTION

The present invention provides an electronic information distribution system that allows remote users to receive, access and query information that is stored in electronic form at a central server, called a repository server. Ideally, users communicate with the repository server via the Internet. The repository server is coupled to the Internet by a web server. The repository server comprises or is coupled to a plurality of databases of information stored in electronic form.

Preferably, the repository server is coupled to one or more remote contributor workstations. The information that is stored at the repository server is received from the contributor workstations in electronic form. According to the representative embodiment of the present invention, the information received from the contributor workstations are files comprising one or more documents. These documents typically would contain text, data, charts, graphs, spreadsheets and the like, or combinations thereof, and may be in many formats. It will be appreciated that any information that can be stored in digital form, such as photographs, videos, sound recordings, etc. may be stored in the files received from the contributor workstations. In the representative embodiment, files received from the contributor workstations are converted at a central site into predetermined format, e.g., for printable documents, a common viewing format such as, for example, PDF format, and thereafter provided to the repository server. In the representative embodiment, each document submitted to the repository server is accompanied by a document profile comprising information organized according to predefined fields relating to the document.

The web server includes a web server program. The web server also includes a web server helper application using the appropriate API such as, for example, the Common Gateway Interface (CGI) program, BGI, NSAPI, ISAPI, or ASP.

According to the representative embodiment of the present invention, each user has a user computer, such as, for example, a personal computer with an Intel Pentium processor and a fast modem that the user can use to connect to the Internet. The user computer has one or more local storage devices. In the representative embodiment, the user computer executes Netscape's Navigator 2.1 browser program. However, other browser programs, such the Mosaic browser or Microsoft's Internet Explorer 2.0 browser could also be used. As used herein, the browser programs executed by the user computer will be termed "Internet browsers."

When the user initially accesses the web server, the user is required to provide a user identification code ("ID") and a password. The web server submits a login request to the CGI program to verify that no other user is using the same ID. According to the present invention, a user is permitted to access the web server from a different user computer or using a different Internet browser; however, the present invention prevents the user (or other users) from "concurrently" accessing the web server from more than one computer or Internet browser using the same ID.

Once the user has provided the ID and password, the repository server will determine what information that user is authorized to receive. According to the present invention, each user has authorization to access all or a subset of the information stored at the repository server.

In the representative embodiment, the repository server can provide the user with a list of new documents that have been recently received by the repository server and which that user is authorized to access. The user may also request a list of documents that fit certain user-specified search criteria. A list of the documents that match that search criteria and which the user is authorized to access is provided to the user computer. The user can then select, request and view documents from these lists.

Different users may be permitted to access different subsets of the documents stored at the central repository.

According to the present invention, the web server is coupled to at least two database search engines in the repository server. At least one search engine performs at least full text searching of textual documents. At least one other search engine performs at least searching on predefined fields of information. When a search is submitted by the user to the web server, it is determined what type of search is required, and the appropriate query (e.g., full text, search on predefined fields) is formulated and submitted to the appropriate search engine. The search engine returns a results set to the web server. Typically, the results set will comprise a list of documents satisfying the query and that the user has authorization to access. This architecture ensures that the most efficient search engine is used to obtain the search results and allows more than one search to be conducted in parallel.

In the representative embodiment, the repository server includes a number of optimizers. An authorization optimizer builds the least expensive (in terms of execution time) search selection clause which will restrict the user's query to the database subset that the user is authorized to access. A sorted queries optimizer speedily provides users with the results set even when the number of elements in the results set is substantial. The web server sends a query block to repository server for optimization and the actual database query is built by a database server.

Communication delays over the Internet are used to make apparent response time at the web server faster by interleaving server access and response through an asynchronous protocol to the search engine.

The web server can provide customized views of the information provided to users. The web server has access to a number of different template forms. The template forms are written in a novel computer language, called herein a "research access language" (or RAL) that describes how to format a HTML document and integrate the information from results set into this format. The web server interprets the template form and creates a HTML page comprising the information from the results set. The web server may have a number of template forms, for each type of query, for each user or class of user, etc. Thus, each user or class of users may receive information in a format defined for that user or class of users. The template forms of the present invention provide an additional advantage. Whenever the information provider wishes to change the output format of the information provided to users, a new template form is created and used by the web server. Template forms can easily be created (without having to "hardcode" any program) and can be loaded for use without having to take the web server off-line.

The present invention is ideally suited for providing investment research reports to investors and investor advisors. Brokerage and investment banking firms create mounds of investment research reports on a daily basis concerning thousands of companies and industries. These reports are provided to investors in electronic form. At present, these reports are distributed over proprietary networks, requiring the installation and maintenance of expensive hardware, software and communication lines.

Because of this expense, the number of users who have access to these proprietary networks is limited. In the representative embodiment, the present invention enables investment research reports to be securely distributed to investors over the Internet. The present invention overcomes the disadvantages of Internet (e.g., slower than proprietary networks, less secure, user interface limited to HTML format) and enables investment research reports to be distributed to a wider range of investors who are authorized to receive such reports.

In an enhanced embodiment of the present invention, an electronic corporate information communication and distribution system is integrated with an electronic brokerage research delivery system. In the enhanced embodiment, remote users receive, access and query corporate information in electronic form.

As used herein, the term "corporate information" means information produced or sponsored by a corporation, partnership, firm or other legal entity about its business, such as, for example, information contained in annual reports, quarterly reports, SEC filings and press releases, information about upcoming events, latest news about the entity, recent management presentations, briefings for analysts and portfolio managers, and the like. For ease of reference, the corporate information communication and distribution component of the present invention is called herein the "Corporate Register."

In this embodiment, the electronic research delivery system of the present invention comprises proprietary information produced by brokerage firms. The Corporate Register comprises corporate information. The corporation's view of events, competition, etc. often differs sharply from that of brokerage firms. Therefore, providing a system that presents both views in an integrated fashion provides investors with additional information useful in making investment decisions and recommendations.

Although seamlessly integrated, a user may be permitted to have access to only the Corporate Register or the electronic research delivery system.

The information in the Corporate Register is made available to users according to a common page layout and navigation path. This enables users to become familiar with the format for corporate information, so as to easily find required information and to speedily compare like information of different corporations. In the representative embodiment, for example, the corporate information for each corporation is arranged in two frames, namely, an index frame and a contents frame. The index frame includes a topic hyperlink to various segments or types of the corporate information, e.g., "corporate highlights", "latest news", "upcoming events", "recent management presentations", "annual and quarterly reports", and "SEC documents". Ideally, the index frame will have mostly the same entries for each corporation. The index frame can be displayed at all times, e.g., in a frame shown in the browser.

The contents frame includes the corporate information, arranged and navigatible according to the topics listed within the index frame. Again, for consistency, similar headings in each topic can be used by each corporation. For example, the "corporate highlights" topic may include headings (as hyperlinks) for "investment highlights", "growth strategy", "product groups" and "financial highlights". Selecting a heading will cause the corresponding corporate information to be retrieved and displayed in the contents frame.

The actual contents (e.g., the corporate information) and the format of the actual contents as displayed in the contents frame is determined by the corporation itself. Thus, the "look and feel" of the actual contents may mirror the corporation's annual report and/or reflect the style, philosophy and vision of the corporation as seen by the corporation.

In short, the contents frame comprises information provided by the corporation output according to the corporations's layout and specification, all within the overall consistent framework of the Corporate Register as "specified" in the index frame and headings. This allows corporations to control their content and format and at the same time enable users to easily locate desired information.

It is expected that the Corporate Register and the electronic research delivery system could be controlled and maintained by a third party intermediary, called herein the Network Manager. In the representative embodiment, the Network Manager is responsible for the overall design and operation of the Corporate Register. For example, the Network Manager could supply blank formatted page outlines to corporate participants, which the corporate participants complete (e.g. by adding content) and return to the Network Manager. The blank formatted page outlines (completed and uncompleted) can be transferred between the Network Manager and the corporations electronically, e.g., by file transfer protocol over the Internet.

A typical user would access the Corporate Register from the electronic research delivery system. For example, when new corporate information was made available by the corporation, the user (if authorized to access such information) would see a reference to that information on the screen of the electronic research delivery system. The user could then select the reference to that new entry (e.g., the reference to the new entry would be displayed as a hyperlink) and this would cause the Corporate Register to be displayed showing the contents of the new entry (e.g., the browser would become active and would retrieve the page(s) with the appropriate information.) As another example, if the user in the electronic research delivery system conducted a search for "IBM", the results would include (along with typical results of such a search in a research delivery system, e.g., morning notes and research reports) reference to IBM's entry in the Corporate Register, which could then be selected as above. As another example, the user could conduct a full-text search for a particular phrase (e.g. "power plant") and the returned results would include reference to relevant Corporate Register entries that contain that phrase (along with typical results of such a search, e.g., morning notes and research reports, that contain that phrase).

From the Corporate Register, the user has the option of selecting an entry to the electronic research delivery system, which will cause an electronic research delivery system screen (e.g., a MultexNet screen) to be displayed, either at an opening screen or showing the results of a search relating to the corporation whose entry was immediately previously viewed in the Corporate Register.

Thus, the present invention allows investors to access corporate information when the investor wishes to do so. Further, a user of an electronic research delivery system will have more complete information than currently available.

As an additional feature, the integrated system of the present invention can include links to a corporation's WWW web site. For example, one entry in the index frame of the Corporate Register may be a hypertext link to that corporation's web site. Alternatively or additionally, the text in the index frame (e.g., the corporate information) may include hypertext entries not only to other parts of the Corporate Register but also to WWW web pages selected by the corporation. As another example, if the user in the electronic research delivery system conducted a search for "IBM", the results would include (along with typical results of such a search, e.g., morning notes and research reports) reference to IBM's WWW web site, which could then be selected and moved to by the user. As another example, the user could conduct a full-text search for a particular phrase (e.g. "automobile tires") in the electronic research delivery system and the returned results would include reference to relevant WWW web sites/pages that contain that phrase (along with typical results of such a search, e.g., morning notes and research reports, that contain that phrase). To enhance the value of the information provided this way, only those WWW web sites/pages selected either by the participant corporations or the Network Manager as containing appropriate information would be indexed and included in such search results.

Thus, the Corporate Register is seamlessly integrated with the electronic research delivery system, for example, allowing one search in the electronic research delivery system to return search results including both research reports produced by brokerage firms and corporate information produced by corporations.

In the enhanced embodiment, the information that is provided to users is stored in electronic form at a central server, called a repository server. Ideally, users communicate with the repository server via the Internet. The repository server is coupled to the Internet by a web server. The repository server comprises or is coupled to a plurality of databases of information, including corporate information and research reports, stored in electronic form.

Once the user has provided the ID and password, the repository server will determine what information that user is authorized to receive. According to the present invention, each user has authorization to access all or a subset of the information stored at the repository server. Thus, different users may be permitted to access different subsets of the documents stored at the central repository. Further, the corporation can regularly monitor use access lists and modify those lists as desired. Such monitoring and modification can take place from remote computers, for example, over the Internet.

Each corporation submitting corporate information has the option of specifying those users or classes of users who are authorized to access that item of information. Additionally, an item of corporate information can be divided into parts or pages, and different users may be permitted to access different parts or pages of the information.

As stated above, hypertext links (e.g., to WWW web sites) may be included in each item of corporate information in the Corporate Register. The corporation may specify that different users be shown different links, or that a link may have different meaning depending on the user. For example, a link in an annual report to detailed sales figures may link a shareholder to a summary chart on the corporation's public web site, and link a corporation employee to a detailed spreadsheet on corporation's intranet, and link a specified analyst to a simplified spreadsheet on a limited access WWW page. As another example, an e-mail link (a link that provides an e-mail address and activates an e-mail client) may provide the e-mail address of the chairman for the largest stockholder and an important analyst, may provide the email address of the corporation's shareholder relations department for all shareholders, and provide no link for others. This feature enables hypertext links in documents to be ENTITLABLE, as specified by the corporation or other party.

The present invention allows participating corporations and research providers (i.e., contributors) to dynamically (and "on-line") authorize (entitle) selected users to access selected documents, document groups, and/or hypertext links. Additionally, the contributors may also dynamically (and "on-line") prohibit (disentitle) selected users to access selected documents, document groups, and/or hypertext links. Additionally, contributors may download entitlement reports listing which users/user groups are entitled to access (or prohibited from accessing) documents or hypertext links.

The present invention also has capabilities to provide usage information to contributors as to access and usage of reports and other information in the repository or Corporate Register. For example, overall summaries could be provided, e.g., that 25% of users accessed Microsoft corporate information, that 400 people read the IBM annual report, and of these, 30% jumped to the IBM WWW site, etc. This type of information is useful to corporations, and at the same time keeps secure the possible investment and research strategies of individual users. Such information may be downloaded by contributors in a variety of formats.

Preferably, the repository server is coupled to one or more remote contributor workstations. Some of the information that is stored at the repository server can be received from the contributor workstations in electronic form. Typically, the contributor workstations are used by brokerage firms to submit research reports and corporations to submit items of corporate information. According to the representative embodiment of the present invention, the information received from the contributor workstations are files comprising one or more documents. These documents typically would contain text, data, charts, graphs, spreadsheets and the like, or combinations thereof, and may be in many formats. It will be appreciated that any information that can now or in the future be stored in digital form, such as photographs, videos, sound recordings, etc. may be stored in the files received from the contributor workstations. Also deliverable are applications and non-static data provided by corporations for both informational and transactional purposes (such as, for example, proxy statements and voting forms.)

In the representative embodiment, the repository server can provide the user with a list of new documents that have been recently received by the repository server and which that user is authorized to access. The user may also request a list of documents that fit certain user-specified search criteria. A list of the documents that match that search criteria and which the user is authorized to access is provided to the user computer. The user can then select, request and view documents from these lists.

Accordingly, the present invention is useful for both corporations and investors, as it disseminates corporate information in a timely and reliable manner, promotes an appreciation of management's performance, assists in broadening shareholder base to "secondary" institutional holders, and encourages a balanced view of the corporation. Often the annual report and other documents (which are targeted to a broad audience) and other methods of distribution may not optimally achieve these objectives.

BRIEF DESCRIPTION OF THE DRAWINGS

FIG. 2 is an example bulletin board screen display.

FIG. 4 is an example query results screen display.

FIG. 7 is an example bulletin board screen display.

FIG. 8 is an example corporate register display.

FIG. 10 is an example initial menu of the entitlement/report subsystem.

FIG. 13 is an example of a report parameter specification page.

DETAILED DESCRIPTION

For ease of description, the embodiment of the present invention described herein is that used for the electronic distribution of investment research reports and morning meeting notes ("reports") to investors via the Internet's World Wide Web ("WWW"). However, the invention is not so limited, and can be used, where appropriate, for the electronic distribution of other types of information via other types of networks.

As used herein, the terms "investor" and "user" include any end user who is permitted to receive or access information via the present invention, such as, for example, customers of brokerage and investment banking firms, employees of brokerage and investment banking firms, investment advisors, brokers, bankers, portfolio and fund managers, journalists, analysts, economists, university professors, MBA students, etc.

Figure 1:
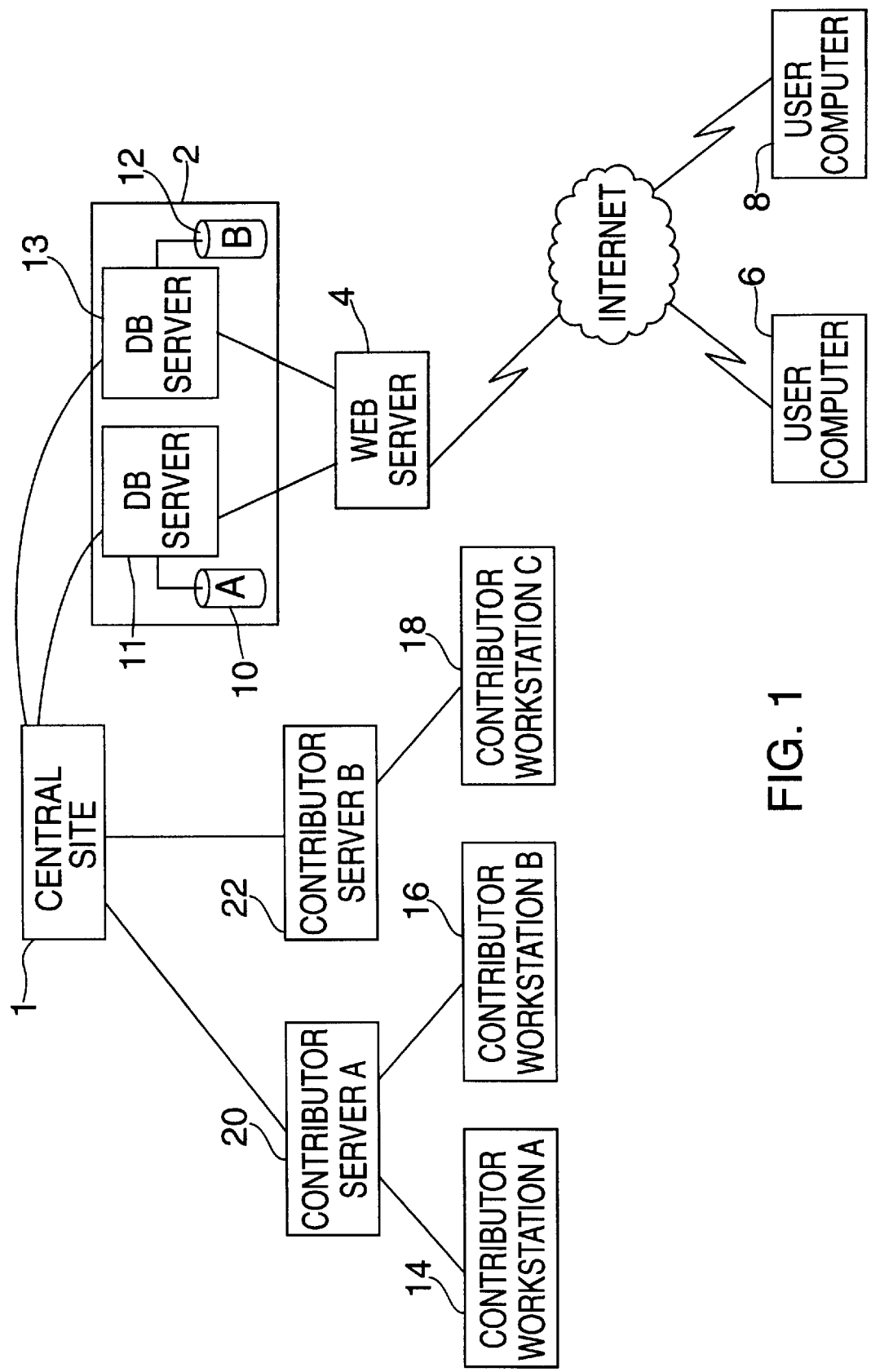
FIG. 1 is a diagram of the overall system architecture of the present invention.

Referring now to the drawings, and initially FIG. 1, there is illustrated an overall system architecture according to the present invention. A central repository server 2 is coupled, via a central site 1, to one or more remote contributor workstations 14, 16, 18. The contributor workstations 14, 16, 18 are used by brokerage and investment banking firms to submit reports to the repository server 2. Optionally, the contributor workstations 14, 16, 18 may be coupled to the repository server 2 via proprietary network comprising a plurality of contributor servers 20, 22. Alternatively or additionally, a contributor workstation may provide reports to the repository server 2 via the Internet.

In the representative embodiment, the contributor workstations execute a program called Multex Contributor™, described in detail in the user manual titled "MX Contributor—User Guide" available from Multex Systems, Inc. of New York, N.Y. and expressly incorporated herein by reference. The Multex Contributor™ program is a real-time Windows-based document indexing and transfer program used to disseminate reports to the central site 1. The contributor simply completes a form (a document profile) displayed on the screen of the contributor workstation 14, 16, 18 and, at the specified time, the Multex Contributor™ program transfers the report, along with the information in the completed form, to the central site 1.

At the contributor workstation 14, 16, 18, the contributor completes a form relating to the report. First, the contributor selects a report for distribution. The report is stored, usually as a file, in electronic form on the contributor workstation 14, 16, 18 or on a server or network drive coupled to the contributor workstation 14, 16, 18. The report may be in any standard electronic format, for example, Pagemaker, Microsoft Word for Windows, Corel WordPerfect, etc. The form has fields relating to the report, for example, title, author, subject, date and time of creation, distribution level (setting distribution to a default group of investors or one of a set of predefined groups of investors) and expiration time. Optionally, the contributor can enter additional information in the form, such as, for example, ticker symbol, industry group, synopsis, country, region, currency, etc.

Once the report has been selected and the form completed, the user issues a "contribute" command to the Multex Contributor™ program and the report and all the information in the form is electronically transmitted to the contributor server 20, 22. In the representative embodiment, the reports are "pushed up" from the contributor servers 20, 22 to the central site 1.

At the central site 1, the reports are processed. Typically, the central site comprises a network of computer processors. At the central site 1, each report is converted to a predetermined format. In the representative embodiment, all reports received at the central site 1 are converted at the central site 1 into a format that can be read by the Acrobat Exchange program, available from Adobe Systems. The reports are then provided by the central site 1 to the repository server 2.

Where desired, the repository server 2 can also receive, store and enable the distribution of other useful information, such as, for example, news reports received from wire services, government reports, product reviews, etc.

The repository server 2 comprises or is coupled to at least two database servers 11, 13. Each database server is coupled to a database storage device 10, 12. A relational database 10, 11 allows field searching. In the representative embodiment, the relational database 10, 11 is an SQL database server 11 coupled to a storage device 10. A full text database 12, 13 allows word or text searching. In the representative embodiment, the full text database 12, 13 is a full text search database server 13 (for example, a full text search engine available from Fulcrum of Ottawa, Canada) coupled to a storage device 12.

The information contained in the form is indexed in the relational database 11 to allow retrieval of the report by searching on such fields, e.g., searches by author, date, industry, etc. Where necessary, information in the form received from the contributor is mapped into "common" terminology as used by the relational database 11. For example, the terms "sports utilities" and "minivans" may be mapped and stored as the term "automobile." ASCII text is extracted from the report and stored in the full text database 12, 13 for full text searching.

The repository server 2 provides investors with lists of reports received from the contributor workstations 14, 16, 18 and allows investors to request lists of reports that fit certain criteria. The investor can select reports from these lists to down-load, view and/or print. Generally, lists of reports can be generated by the web server 4.

The contributor of a report can be notified that a particular investor has accessed that report. The repository server 2 maintains for each report a list of those who accessed that report. The repository server 2 can transmit that list to the report's contributor on a regular basis and/or when requested by the contributor.

The repository server 2 is coupled to a web server 4 which in turn is coupled to the Internet via, for example, a T1 or ISDN connection. The web server 4 is a high powered server computer that runs a web server program. In the representative embodiment, the web server 4 executes, for example, Netscape's Commerce Server program. The web server program allows web pages (in HTML format) to be accessed by investors. The web server 4 also executes other programs and subroutines as required.

Each investor has a user computer 6, 8, such as, for example, a personal computer with an Intel Pentium processor and a fast modem. In the representative embodiment, the user computer 6, 8 executes an Internet browser program, such as, for example, Netscape's Navigator 2.1 browser program. The Internet browser can read files in HTML format. In the representative embodiment, the Internet browser has access to a plug-in program that can read files in the predetermined format. In the representative embodiment, the plug-in is the Acrobat Exchange program, available from Adobe Systems that can read files in ".pdf" format. The user computer 6, 8 can connect with the Internet via, for example, a commercial Internet Service Provider.

The web server 4 includes to a web server helper application, which in the representative embodiment is the CGI (common gateway interface) program, that is activated by investors through web pages provided by the web server 4. CGI is an interface between the web server program and other programs. CGI lets those other programs process HTML forms and other data coming from Internet browsers, and then lets the other programs send a response back the web server 4 to be delivered to the Internet browser. The response can be HTML files, GIF files, PDF files or any data that the Internet browser can view. Thus, generally, when an Internet browser requests a document from the web server 4, the web server 4 server program finds the document and sends it to the Internet browser. However, if the Internet browser requests a CGI program, the web server 4 server program acts as a middleman between the Internet browser and the CGI program. Other web server helper applications, such as, for example, BGI, NSAPI or ISAPI, can be used in place of CGI within the principles of the present invention.

Access to the web server 4 begins from an investor's Internet browser. Initially, the investor can access "public" web pages generally describing some of the features of the document delivery service of the present invention. If the investor chooses to proceed, the investor selects the "log-in" option from the initial web page.

User Verification: The first step the web server 4 takes in handling an investor request is verifying that the investor is permitted to access the information stored at the repository server 2. This is accomplished using the standard verification procedure built into the communication protocol between Internet browsers and web servers.

The web server 4 uses Netscape's Commerce Server's ability to call custom verification subroutines when a user tries to access CGI's and web pages. The web server 4 executes a subroutine and, using Netscape's NSAPI, receives the ID and password that the investor is asked to provide by the server/browser, and then verifies the ID and password against a database of authorized users (the user database) maintained at the repository server 2. If the user is verified, the Internet browser will be given a verification signature. An investor who is not in the user database, or enters an incorrect password, is denied access to CGI's and web pages on the web server 4 by simply having the subroutine return an "Access Denied" flag to the web server 4. This subroutine maintains an open connection to the user database to improve performance.

Whenever an investor makes a query for a list of reports, the investor's Internet browser sends an HTTP (hypertext transfer protocol) request that represents what the user wants to the web server 4. If the request does not have a verification signature attached to it, the web server 4 sends a command back to the Internet browser, causing it to prompt the user for an ID and password. The Internet browser will then return this information to the web server 4, which will verify that the user is entitled to access the reports stored at the repository server 2. If the user is verified, the Internet browser will be given a verification signature. If not, the user will be prompted again for his ID and password. Once access is verified, the web server 4 will start the CGI program named in the original HTTP request, along with any runtime parameters that are specified in the request. The CGI program first verifies that the user making the request (whose ID is passed to the CGI program by the web server 4 through, for example, an environment variable) is the only one using that ID at that moment. This is done by the following method:

a. The CGI program gets the value of the Internet browser "cookie", and extracts the value for the named pair "mxauth" from the cookie.

b. If the value is empty, the CGI program indicates that this user is accessing the web server 4 for the first time since starting his or her Internet browser. This user then becomes the designated "current user of this ID". A new random value for the "mxauth" part of the browser cookie is generated, stored on the web server 4 under this user's ID, and sent back to the Internet browser, so that the Internet browser can send it back next time.

c. If the value is not empty, the CGI program indicates that this user has previously already accessed the web server 4 since starting the browser program, and has been given an authorizing cookie. If the "mxauth" value of the cookie does not match the value stored on the web server for this user, then this user has been superseded by another user using the same ID. The CGI does not perform the requested task, and tells the user that access is denied. If the "mxauth" value of the cookie does match, then this user is authorized to continue, and the CGI performs the requested task. Each time the user is authorized to continue, the time of the access is stored on the web server 4.

d. A stored cookie value that is over an hour old is considered "stale". A user whose code does not match a stale cookie is allowed access as if the user was initially signing on, as per b. above.

Part of the rationale for this method comes from the lack of a "sign-off" from a user. When a user "leaves" the web server 4 to browse other parts of the WWW, or closes down his or her Internet browser, the web server 4 is not informed.

(For reference, it is noted that cookies are a general mechanism which server side connections, such as CGI scripts, can use to both store and retrieve information on a client side of an Internet connection. A web server, when returning an HTTP object to an Internet browser, may also send a piece of state information which the Internet browser will store Included in the state object is a description of the range of URLs for which that state is valid. Future HTTP requests made by the Internet browser which fall within that range will include a transmittal of the current value of the state object from the Internet browser to the web server. For no compelling reason, the state object is known in the art as a "cookie.")

Other systems that allow only one instance of an ID to be active at one time rely on a "sign-off" notification to tell when the ID can be used again for "sign-on". Because the web server 4 does not receive a "sign-off", it is assumed that any new user is allowed to "sign-on" with that ID, but all others that are currently using that ID will now be denied further access, until they "sign-on" again (which involves closing down the browser, then restarting it again). Furthermore, step d. is included to keep a user from locking himself out of his own ID if he happens to use browsers from two different locations, such as home and office.

Thus, the following scenarios apply:

Scenario 1:

User 1 signs on to the web server 4 at his office. The CGI marks this browser/user ID combination as the current user.

At 5:00 PM, he goes home, without closing down his browser.

At 5:45 PM he signs on from his home computer. The CGI now marks this browser/user ID as the current user.

At 10:00 PM, he goes to bed, without turning off his browser.

At 8:00 AM the next day, he arrives at work, and tries to access the web server 4 again. Because his 10:00 PM cookie is now "stale", the CGI marks the office browser/user ID as the current user.

Scenario 2:

User 1 signs on to the web server 4 at her office. The CGI marks this browser/user ID combination as the current user.

She then goes to the desk of User 2, and shows User 2 "this new web service", using her own user ID and password to sign on to the web server 4. The CGI marks User 2's browser as the current user of User 1's ID.

After a few minutes, User 1 returns to her or iginal computer, to find that the CGI is denying her access. User 2 has her locked out by using her ID.

This user verification system is particularly well suited in information delivery systems where a fee is charged per ID/password.

Web Server: The web server 4 uses a single CGI program that handles all the types of requests that a user makes to the web server 4. In the representative embodiment, the types of requests that the CGI program can handle are:

Return a list of reports recently received at the repository server 2.

Reformat the current list of reports.

Present a form that allows the user to specify criteria for reports the user wants to access.

Return a list of reports matching the criteria in the form mentioned above.

Return a list of reports summarized by report contributor.

Return a list of reports authored by a specific contributor.

These requests are handled similarly, except for the request for the form that the user fills in to specify criteria for reports that the user wants to access.

Except for the third request listed above, a query is formulated (whose parameters are determined by the runtime arguments given to the CGI from the original HTTP request from the investor) by the web server 4 and sent to the appropriate database 11, 13. A result set (a list of reports) is returned and stored in memory. The CGI then opens a HTML template form that comprises RAL (research access language) elements, fills in each RAL element with data from the result set and sends the contents of the template to the Internet browser through the Web Server 4. (In the case of the reports that are summarized by contributor, the CGI simply condenses the list of headlines internally to summary form, before using the template.) When the output from the CGI is received at the investor's Internet browser, the browser forms it into a "page" of information, along with action buttons that the investor can select to initiate other requests.

The request to present a "report query form" (the third request listed above) calls for the CGI to make two queries from the relational database 11. The first query is for a list of all contributors whose reports this investor has authorization (i.e., is entitled) to access. The result set of this query is used to fill a list box, from which the investor is expected to pick the particular contributors whose reports the investor would like to access. The second query is for a list of all industries. The result set of this query is used to fill a list box, from which the investor is expected to pick the particular industries that the investor is interested in. These list boxes are defined in the HTML template with RAL elements that are appropriate to this particular user request.

When a query is made, the web server 2 selects the appropriate database to which the query is first routed. In summary, if the query involves text matching (e.g., a full text search) within reports, the query is passed to the full text database 13. If the query does not involve text matching within reports, the query is passed to the relational database 11.

In the representative embodiment, each database comprises a number of database servers networked together. (for example, database server 13 comprises a network of database servers.) The database servers that are available to the CGI are listed in the WEBPUBL.INI file on the web server 4. When satisfying a non-text matching query, the CGI will attempt to use an SQL type server (e.g., 11) first. If that database server is not available, the CGI will automatically switch to the next available SQL database server. (If all SQL database servers are not available, then the query will be passed on to full text database server (e.g. 13).) When satisfying a text matching query, the CGI will attempt to use an full text database server (e.g. 13). Again, if that server is not available, then its backup will be tried, and so on, until either a server can satisfy the query, or all servers have been found to be down. In addition to this automatic backup system, the CGI practices semi-random selection of servers in an effort to balance the load on the servers. This means that the order that servers are tried is not always the same.

The HTML template forms that the CGI uses rely on forms that are part of HTML. This allows the users to select buttons on the pages to submit requests. Each page may have several buttons, and the names of the buttons (the actual visible text in them) are used in the CGI to identify which button the user selected, and therefore, which action to perform. Parameters for a query are taken from other form constructs, such as text fields, list boxes, and combo boxes. When a form does not actively show a parameter value, but it would be convenient for the CGI to maintain its value for the next user request, the values are stored as "hidden" fields in the form. (A hidden field is a form construct defined in HTML for just this purpose.) This allows the parameters of a query to be stored in a page that shows the results of a query, so that they can then be used again as starting values when the user requests the report query form.

Authorization: In the representative embodiment, each user has authorization (i.e., is entitled) to access a subset of the information stored at the repository server 2. The contributor determines who has access to each report. For example, an investment bank may designate that one of its reports can be accessed only by its employees and certain investors (e.g., its customers). Another report may be designated as accessible by employees only. A third report may be released for general distribution to all who wish to access that report.

Every document contributed by a contributor is identified by a "contributor ID". Furthermore the document is assigned by the contributor to one or many "document groups" owned by the contributor. (Documents usually belong to one document group.)

The authorization information links an investor to a list of document groups. Each investor may be permitted to access documents in one, some or all document groups.

The repository server 2 constantly maintains an up to date list of all the report groups available along with the reports in the relational database 11. This list is updated in real time after a report is added, and completely refreshed daily (e.g., after report removal of expired reports). The list is also updated after a contributor changes the entitlement status of an individual investor (or investor group).

To submit a query, an investor must be identified by the repository server 2. As the investor's credential are checked (see above), the authorization information is retrieved by the repository server 2. This authorization information contains a list of report groups the investor is permitted (entitled) to access.

Optimizations: Two types of optimizations are performed by repository server 2. The first is a simplification of the authorization restriction. The second is an optional optimization performed when the result set has to be sorted; it is aimed at reducing the perceived response time for the first answers to a query.

One of the characteristics of the architecture of the present invention is that each query submitted to a database 11, 13 is submitted as a structure description, rather than a fully formed SQL statement. The actual SQL statement is built by the database server 11, 13 itself. Thus, the optimizations can take place on the raw query definition (i.e., a structure definition) before executing the query. This allows for more powerful query optimization, and immediate query definition analysis to select the proper mechanism to execute it.

In the alternative, the actual SQL statement may be fully formulated and then submitted to the database server 11, 13.

1. Optimization of the authorization restriction

In query definition, the investor can restrict the query to a subset of the contributors the investor has access to. This feature is used to implement queries like "'What's new today from XYZ" and "All reports relating to automobiles from PQR."

The purpose of the authorization optimizer is to build the least expensive (with respect to execution time) selection clause, which will restrict the investor's query to the database subset the investor is allowed to access.

The authorization optimizer uses this database content information, combined with the investor's accessible groups, as well as the contributor restriction in the query, to build the restriction clause using the following method.

The repository server 2 builds two lists of groups:
a) the list of groups the investor has requested and has access to.
b) the list of groups the investor has requested but doesn't have access to Based on the number of elements in these two lists the authorization optimizer will build the proper restriction clause.

The following pseudo code describes the actual code used to implement this algorithm:

```
for (all the groups in the investor's allowed group list) do
begin
        if (group is in the query contributor restriction)
                and group is in database)
        then add group to the allowed list
end
for (all the groups in the database) do
begin
        if (group is in the query's contributor restriction)
                and group is not in the investor's allowed list)
        then add group to the disallowed list
end
if (allowed groups list is empty)
        then deny request
else if (disallowed groups list is empty)
        then no restriction
else if (decisionFunction (allowed list, disallowed list))
        then restrict to groups in allowed list
        else restrict to groups not in disallowed list
```

The "decisionFunction" selects the shorter of the two lists, namely, allowed list and disallowed list.

This optimization is more efficient when the database's content is close from the investor authorization, since it works by trimming the unnecessary restrictions for groups without reports in the database.

To improve the efficiency of this optimization when the number of groups in the database grows, the records could be dispatched to different tables based on groups and the same optimization algorithm could be used to select the appropriate table and generate a different restriction clause for every table targeted.

2. Optimization of sorted queries

The purpose of the sorted queries optimizer is to provide the investor with a fast answer even when the number of elements to sort is substantial.

Unlike other applications used in memory sorting, database sorting can rely on a buffer being swapped in and out to disk from the main memory. When the number of items to sort becomes significant, these I/O operation can consume a lot of time. When an investor submits a query via the Internet, the repository server 2 via the web server 4 returns the first hundred rows by default, the most recent reports being displayed first. The actual query result may contain thousand of reports. Thus, to display the hundred most recent reports, the database has to sort the whole result set before returning any answer.

In order to provide the investor with a quick answer, the sorted queries optimizer will try to run multiple queries, each for a smaller subset of the query. If the query has to be sorted by the report's date, the sorted queries optimizer divides the requested time period of the query definition into multiple chunks and executes the same query restricted to every chunk. Accordingly, the sorted queries optimizer does not disturb the sorting order.

Based upon tests of real data sets, it was found that it was more efficient to perform only two queries, rather than a lot of them. The first query is performed on the first 10th of the time period, the second one on the remainder period. For some typical queries, the second subquery execution is unnecessary since the first query had already returned the number of rows requested by the investor.

For database 13, the retrieving of a count is orders of magnitude faster than retrieving the full result set. The present invention takes advantage of this characteristic to give an immediate feedback to the investor. As soon as a query is submitted, the present invention performs a count and sends this information to the web server 4. The web server 4 can take advantage of this feature to return that information to the Internet browser by flushing it's internal buffers. That way, even when the retrieval of the result set takes tens of seconds, the investor gets some feedback in seconds.

Ideally, the sorted queries optimizer is used only for sorted queries and when the number of rows is above a given threshold. The present invention uses the result of the count to trigger the sorted query optimization.

The following pseudo code describes the code used to implement the sorted queries optimizer:

```
Retrieve the count
if (Query is sorted by a time) and (count >= threshold) then
    begin
        if (query definition contains a time range)
            then get the time range from the query definition
            else use an appropriate default value
        add the restriction for 1/10th of the time range
        retrieve the first rows
        rows_still_to_fetch = rows_requested - rows_already_fetched
        if (rows_still_to_fetch > 0)
            begin
                add the restriction for remainder of the time range
                retrieve rows_still_to_fetch rows
            end
    end
```

This optimization significantly improves the response time when the time to perform the additional query is negligible compared to the time necessary to sort the full set.

The communication delay inherent in the connection between the Internet browser and the web server 4 may also introduce additional delays hiding some of the optimization benefits.

Templates: According to the present invention, the web server 4 executes a research access program. The research access program provides a mechanism that enables an investor to access the information in the databases 11, 13. The research access program also implements an Internet CGI, which accepts input parameters from HTML forms, and then using templates forms, generates HTML pages comprising information retrieved from the databases 11, 13. The template forms are written in a novel computer language, called herein a "research access language" (or RAL) that describes how to integrate the information retrieved from the databases 11, 13 into this form. The template forms include RAL elements, as discussed in detail below.

The present invention allows investors to submit queries and receive in response thereto a list of reports that satisfy the queries. The queries are constructed from one or more search parameters, including: which contributing company published the report; which stock symbols figure prominently in the report; when the report was published; what industries are featured in the report; and keyword search parameters.

An investor may enter search parameters at a user computer 6, 8 via a web page provided by the web server 4. When the investor selects the "submit" button on the web page, the search parameters are forwarded by the Internet browser to the web server 4. The search parameters are used to form a query. The query is submitted to the appropriate database 11, 13 and a list of matching documents is generated. This list is formatted on the web server 4 into HTML form, and sent to the investor at the user computer 6, 8, where the investor's Internet browser displays the list to the investor.

The input to the research access program of the present invention comes from HTML forms completed by investors.

The fields that can be searched on for document queries (and the expected values of such fields) include:

date: A date range from "today" backwards, matching a document's official release date. Possible values include:

0 Today
1 Last 2 Days
2 ThisWeek
3 Last 7 Days
5 Last 14 Days
7 This Month
8 Last 30 Days
10 All Dates
12 Last 60 Days
13 Last 90 Days ticker: A field for ticker symbols.

query: A field for "free text" for searches of the document text. Logical expressions can be used, including the ampersand ('&') for a logical 'and', and the pipe character ('|') for a logical 'or'. Parenthesis can be used for grouping expressions, and double quotes can be used to group words into phrases. All free text searches are not case sensitive.

For example:

| | |
|---|---|
| microsoft | Find documents with 'microsoft' in their text. |
| ibm & microsoft | Find documents with 'ibm' and 'microsoft' in their text. |
| ibm\|microsoft | Find documents with either 'ibm' or 'microsoft' in their text. |
| ibm & (microsoft \|apple) | Find documents with 'ibm', and either 'microsoft' or 'apple' in their text. |
| "earnings report" | Find documents with the phrase 'earnings report' in their text. | contributors: A field for a comma separated list of contributor ID's.

industries: A field for a comma separated list of industry ID's.

There are a number of options for displaying information to an investor. Some of these options are based on technical limitations (such as line speed), while others are based on the preferences of the investor (e.g., tabular output, prose, etc.). In order to react quickly to changes in display requirements, the research access program of the present invention utilizes template forms to format HTML pages comprising search results. According to the present invention, information retrieved from the databases 11, 13 is placed in HTML page format according to changeable template forms for said HTML pages.

Thus, input (included in the HTML forms completed by investor) to the research access program of the present invention from an investor can include view mode parameters relating to the format in which the investor wishes to receive the search results and other information. By supplying view mode parameters, the investor can indicate to the web server 4 the desired format of information, including how many records of information are displayed. View mode parameters (and expected values) include:

FT: Form Type. Expected values are 'L' for 'list format', 'T' for 'table format', and 'D' for double line format.

viewmode: This field indicates whether all records that are returned by a query should be displayed (within reason—in the representative embodiment, there is a display limit of 1000 records), or whether the number of records display should be limited to a predetermined number. If the 'viewmode' value is set to 'all', then all records will be displayed. Otherwise, the number of records displayed will be limited to the predetermined number.

To submit a query, the user completes the fields discussed above and then selects a "submit" button. When an investor submits a query, the name and value of the HTML form 'submit' button selected are treated as input. In the representative embodiment, if the following strings appear in the 'name' of the submit button, they are treated in the following manner:

submit: Make a query according to the parameters listed above.

bboard: Same as submit, except that the query formulated includes the requirement that only documents recently received at the repository server 2, e.g. since midnight, be returned.

long: Change the view mode to a double line format.
short: Change the view mode to a list format.
table: Change the view mode to a table format.
summary: Same as submit, but also requests generation of a summary list, breaking down the number of documents that match the query by submitting contributor, and the document type (research document, or morning call note). In addition, generates stored HTML files for each contributor in the summary, with one listing of the individual research documents, and another for the individual morning call notes. In the summary list, generates links to the stored HTML files.

notes: Same as summary.
all: Change the view mode to view all documents.
last: Change the view mode to view the 100 most recent documents.
query: Generate a query form for the user.
count only: Display the number of documents that match the query that matches the current parameters.
company search: Generate a list of companies (named symbols), and place the list in a form from which the user can choose a company to perform a search upon.
choose symbol: Generate a query form for the user, presetting the ticker input item to the value selected from a symbol list.

The program output, of course, depends upon the input including which 'submit' button was selected by the user. The user's choice of a submit button determines which template will be chosen for output.

Additionally, templates may be preset for a user or a group of users. Thus, all users from a particular company or geographic area may be assigned one group of templates and all users from another company or geographic area may be assigned another group of templates.

Once a template file is opened, the characters in it are passed directly through to standard output (the normal CGI output channel), until an RAL element is encountered. In that case, the RAL element is processed according to the rules set forth below, and the output from the RAL element is also sent to standard output, inserted into the stream of characters in the template.

The following are examples of templates that may be used:

resultrl.tpl:
List form output for a query.
resultrd.tpl:
Double line output for a query.
resultrt.tpl:
Table form output for a query.
resultcl.tpl
List form output for a query, broken down by contributor and document type during a summary.
resultcd.tpl
Double line output for a query, broken down by contributor and document type during a summary.
resultct.tpl
Table form output for a query, broken down by contributor and document type during a summary.
resultq.tpl
Query form.
resultx.tpl
Query count.
resulti.tpl
Symbol Guide form.
resultt.tpl
Standard HTTP header prepended to each of these templates.
bboardrl.tpl:
List form output for a bulletin board.
bboardrd.tpl:
Double line output for a bulletin board.
bboardrt.tpl:
Table form output for a bulletin board.
bboardcl.tpl
List form output for a bulletin board, broken down by contributor and document type during a summary.
bboardcd.tpl
Double line output for a bulletin board, broken down by contributor and document type during a summary.
bboardct.tpl
Table form output for a bulletin board, broken down by contributor and document type during a summary.

If a query is submitted with no parameters filled in, the query is termed a bulletin board query and requests the most recently available documents on all subjects.

Research Access Language

The following is a description of the RAL of the present invention. RAL elements begin with a start token, finish with an end token, and contain attributes in between. The start token is followed by a "white space" character. Attributes are indicated by the name of the attribute, followed by an equals sign ("="), followed by the value of the attribute. An attribute name consists of consecutive alphabetic characters. An attribute value consists of consecutive non-white space characters, unless it is enclosed by double quotes, in which case it consists of all characters enclosed in a pair of double quotes. An end token contained within a non-quoted attribute value will truncate the attribute value, and the language element. The following is a syntax description of an RAL element:

```
start-token     := "{mx" <white-space>
white-space     := (any ASCII character value between 1 and 32, inclusive)
end-token       := "}"
attribute       := <attribute-name> "=" <attribute-value>
attribute-name  := "end" | "name" | "true" | "width" | "align" | "start" | "false" |
                   "empty" | "match" | "format" | "select" | "quotes"
attribute-value := <double-quotes> <any-characters> <double-quotes> | <any-non-
                   white-characters (except end-token)>
Examples:
        {mx name=headline align=left width=50}
        {mx start=documents}
        {mx name=synopsis match=1 true=Yes false=" "}
```

Attribute Names align

The 'align' attribute specifies the alignment of the output from the current element, within the width indicated by the 'width' attribute in the element.

Possible values:

left (default)

center right

See also:

width empty

The 'empty' attribute specifies what should be displayed as output for the current element, if the evaluated output for the element (before padding or alignment) is an empty string. This attribute is different from others, in that it remains in effect for all following language elements, until its value is changed.

Possible values:

(Any string. Use "" to indicate an empty string.)

end

The 'end' attribute marks the end of a loop. The attribute value indicates which type of loop the current element marks the end of.

Possible values:

document contributorlist industrylist symbollist

See also:

start false

The 'false' attribute specifies a string value to be displayed as output for the current element if the evaluated value for the 'name' attribute does NOT match the value of the 'match' attribute. This string may also use the '% s' feature described under 'format'.

Possible values:

(Any string. Use "" to indicate an empty string.)

See also:

match, true, format format

The 'format' attribute specifies simple output formatting for output of the current element. Its format is the same as a C language printf() format string, but allows only string formatting (% s), and only one occurrence of that within the format string. The evaluated value of the element, as a string, is used as the value to fill the '% s' in the formatting string.

Some examples are:

| Format string | Element Value | Output Result |
| --- | --- | --- |
| "%s" | "ABC Corp." | "ABC Corp." |
| "%15s" | "ABC Corp." | "ABC Corp." |
| "%-15s" | "ABC Corp." | "ABC Corp." |
| "%5.5s" | "ABC Corp." | "ABC C" |
| "%s Documents" | "ABC Corp." | "ABC Corp. Documents" |

Possible values:

(Any valid C printf() formatting string.)

See also:

align, width match

The 'match' attribute specifies a value which the RAL processor will compare to the evaluated result from the 'name' attribute. If the two values match exactly, then the output from the current element will be the string specified by the 'true' attribute, otherwise the output will be the string specified by the 'false' attribute.

Some examples are:

| Match | True | False | Element Value | Output |
| --- | --- | --- | --- | --- |
| "1" | "Synopsis" | " " | "0" | " " |
| "1" | "Synopsis" | " " | "1" | "Synopsis" |

Possible values:

(Any valid string. Use "" for an empty string.)

See Also:

true, false, name name

The 'name' attribute specifies a data field to be used as the output for the current element. The data field name given as the value for this attribute is the name of a field in a research document description, a contributor description, an industry description, or a stock symbol description. A list of data fields supported is given in the "Data Fields" sections below. The field name can also specify any CGI input field (for CGI programs using RAL) by prepending an underscore character to the input field name, or it can specify any .INI file entry or environment variable by prepending a dollar sign to the entry/variable name.

Possible values:

(Any valid data field name, or _cgi-input-name, or $ini-entry-name, or $environment-variable-name.)

See also:

match, Data Fields quotes

The 'quotes' attribute indicates whether output from the current element should be surrounded by double quotes. If this attribute is set to "1", the 'width' and 'align' attributes are ignored.

Possible values:

"1" to surround output by quotes

"0" to not surround output by quotes (default)

start

The 'start' attribute indicates the beginning point of a loop, with each iteration of the loop enumerating the data items specified by the value of this attribute. See the section "Data Enumeration" below for details.

Possible values:

documents contributorlist industrylist symbollist

See also:

end, Data Enumeration true

The 'true' attribute specifies a string value to be displayed as output for the current element if the evaluated value for the 'name' attribute matches the value of the 'match' attribute. This string may also use the '% s' feature described under 'format'.

Possible values:

(Any string. Use "" to indicate an empty string.)

See also:

match, false, format width

The 'width' attribute specifies a number which gives the desired width, in characters, of the output for the current element. If the currently evaluated output is shorter than the 'width' value, then the output is padded with spaces on the left, right, or both, according to the value of the 'align' attribute. If the output is longer than the 'width' attribute, the output is truncated on the right, and the last three characters are replaced with periods ('. . .') to indicate a truncated value.

Possible values:

(Any valid integer.)

See also:

align

Data Enumeration

The RAL attributes 'start' and 'end' are used to mark elements that are to be repeated during the enumeration of data objects. For example, {mx start=documents}{mx name=headline}{mx end=documents} would cause RAL to enumerate all documents that match the current query, outputting the headline of each one. (By placing the 'end' element on the next line, it also causes the headlines to be separated by an end-of-line character). The available enumerations are listed below. All enumerations are filtered so as only to include documents the user that is making the enumeration is authorized to access. That is, not all users see the same results when making enumerations, according to their level of authorization.

documents

The 'documents' enumeration loops through the result set of a query on the database of research documents. In the current implementation, the input parameters to the query are taken from CGI input items from an HTML page. They are:

daterange: An integer from 0 to 12 specifying a date range for the release date of a document. The possible values are:

0 Today
1 Last 2 Days
2 ThisWeek
3 Last 7 Days
5 Last 14 Days
7 This Month
8 Last 30 Days
10 All Dates
12 Last 60 Days
13 Last 90 Days ticker: A field for ticker symbols.

query: A field for "free text" for searches of the document text. Logical expressions can be used.

contributors: A list of contributor ID numbers which identify the contributors.

industries: A list of industry ID numbers relating to the document.

The following fields are available within a 'documents' enumeration, listed with the data they output:

Analysts Names of the analysts that compiled the document.

AnalystIDs Numeric ID's of the analysts that compiled the document.

ByteCount Size of the document (in PDF form) in kilobytes or megabytes.

Contributor Name of the company that compiled the document.

ContributorID Numeric ID of the company that compiled the document.

DocID The internal system document ID number.

DocType 'R' for a research document; 'M' for a morning call note; 'N' for a news document.

Headline The headline of the document. The system of the representative embodiment also surrounds the output from a element that displays this field with an HTML "anchor" to a CGI that downloads the PDF file for the document, or generates an HTML page for documents with no PDF form.

PageCount The number of pages in the document.

ReleaseDate The official release date of the document.

Relevance A number from 0 to 1000 that indicates the relevance of the document to the free text that was used in the query. The higher the number, the more matches on the free text.

SubmitDate The date the document was submitted by the contributing company to the repository server 2.

Symbols A list of ticker symbols that the contributor listed as relevant in the document.

Synopsis A "1"/"0" flag that indicates whether a synopsis is available for the document. By default, the value "Yes" is output if the synopsis is available, and "" is output otherwise. The representative embodiment also surrounds the output from a element that displays this field with an HTML "anchor" to a CGI that creates an HTML page with the actual synopsis text.

The following fields are available outside a 'documents' enumeration, since they are summary information or status information. Their values depend on the same query used within a 'documents' enumeration:

ChangeViewMode

Generates text that can be used within a button to change the mode used to display documents. When the current view mode is set to show all documents, this data field generates "View Last ###", where ### is equivalent to the "Maximum" data field. When the current view mode is not set to show all documents, this data field generates "View All ###", where ### is equivalent to the "Total" data field. This text can be used as the value of a 'submit' button in HTML, and a CGI can perform the appropriate action to change display modes.

ContributorFilter

Displays the name of the current contributor being used to filter documents.

ContributorsText

Displays the names of all contributors whose codes appear in the _contributors field.

Count

Displays the total number of documents actually retrieved by a query, as opposed the number of documents that actually match the query. When the view mode is set to show all documents, this field is equivalent to the "Total" data field. Otherwise, it is equivalent to the "Maximum" data field.

CountFilter

Displays the number of documents that match the current document type and contributor filter.

DocsShown

Generates variable text, depending on the view mode (all documents, or the limited (100) set). If the view mode is set to return all documents, this data field generates the text "### Entries", where ### is equivalent to the "Count" data field. If the view mode is not set to view all entries, the data field generates the text "Last ### of * Entries", where ### is again equivalent to the "Count" data field, and * is equivalent to the "Total" data field.

DocTypeFilter

Generates the text "Research", "Morning Call Notes", or "News", depending on the current value of the document type filter.

IndustriesText

Displays the names of all industries whose codes appear in the _industries field.

Maximum

This data field is the limit on the number of documents to be retrieved when the view mode is not set to show all documents. In the representative embodiment, this value is 100 by default, or the value specified in the "MaxRows" entry in WEBPUBL.INI.

MaxRows

If the view mode is set to show all documents, this data field is equivalent to the "Total" field. Otherwise, it is equivalent to the "Maximum" field.

MorningNotes

This data field is the number of morning call notes attributed to the current contributor specified in the contributor filter.

News

This data field is the number of news stories attributed to the current contributor specified in the contributor filter.

Research

This data field is the number of research documents attributed to the current contributor specified in the contributor filter.

Total

This data field is the total number of documents that match the current query parameters, regardless of view mode, contributor filter, or document type filter.

ViewMode

This data field generates "all" if the current view mode is set to view all documents that match a query. This field generates "last" if the current view mode is set to view only the last N documents that match a query, where N is equivalent to the "Maximum" data field.

contributors

The 'contributors' enumerations is the same as a 'documents' enumeration, except that the documents are grouped by their contributors. The only fields that can be displayed are the contributor names, and the number of documents in the research and morning notes categories. This enumeration is used primarily for presenting document summaries by contributor to the users.

The following fields are available within a 'documents' enumeration, listed with the data they output:

Contributor

Names of the contributor in a group.

MorningNotes

The number of morning notes submitted by the contributor.

Research

The number of research documents submitted by the contributor.

contributorlist

The 'contributorlist' enumeration loops through the list of contributors from whom documents are available. This list is not based upon any query parameters—if a user is entitled to see the documents of a particular contributor, the contributor's name is returned in the result set.

The following data fields are available within a 'contributorlist' enumeration:

ContributorID

An integer that identifies a contributor uniquely.

ContributorName, or Contributor

The name of the contributor.

The following data fields are available after a 'contributorlist' enumeration.

ContributorCount

The total number of contributors in the 'contributorlist' enumeration industrylist The 'industrylist' enumeration loops through the list of industries about which documents may be compiled. There are no query parameters for the industry list. The following data fields are available within a 'industrylist' enumeration.

IndustryID

An integer that identifies an industry uniquely.

IndustryName

The name of the industry.

symbollist

The 'symbol list' enumeration loops through all ticker symbols/company names that match a given input string. In the representative embodiment, the input string is taken from the CGI input item named 'company'. If a company name contains the input string, the ticker symbol/company name is included in the result set for enumeration.

The following data fields are available within a 'symbollist' enumeration.

SymbolID

The stock ticker symbol recognized for a company on the stock market exchange where it trades.

SymbolName

The name of the company.

Program Control

RAL allows logical control over its output. The -if, -endif, and -defer allow a template to make decisions about output based on run time values of CGI input variables, environment or .INI variables, and the values of data fields from enumerations. If a -if element evaluates to FALSE, then all text and elements between the starting -if element and its terminating -endif element will not be passed through to output. If a -defer element is used inside a regular RAL element, then the rest of the element is not evaluated, and is simply passed through to output, without the -defer element.

This allows a template to evaluate some RAL elements, and leave others to be evaluated later, if the output is used as a template itself.

```
-if and -endif Usage
{mx -if <expression> }
...
{mx -endif}
where
expression  := <value> <operator> <value>
value       := <string> | <number> | <variable>
operator    := == | < | > | != | <= | >=
string      := <double-quote> [<any-characters>]+ <double-quote>
number      := <digit>*
variable    := [_ | $ ]<alphabetic character> [<alphanumeric characters>]+
```

Only one expression is allowed. A variable that does not evaluate to a known value will be treated as if it were a string. If a variable is preceded by an underscore ("_"), its value is taken from a CGI input variable with that name, minus the underscore. If a variable is preceded by a dollar sign ("$"), its value is taken from the environment variable or from the program's .INI entry which matches the variable name, minus the dollar sign.

The following example shows how the -if element can be used to display some text and values only if there are actually some morning notes in the result of the query.

{mx -if morningnotes !=0}There are {mx name=morningnotes}—Click the "AM Notes" button to access them. <BR >{mx -endif}

The following example shows how a CGI input variable can influence the output. In this example, if the "contributors" CGI form variable is not empty, then some text will be output, along with a built-in field that displays the names of all the contributors whose ID codes are in the "contributors" CGI form variable.

{mx -if _contributors !=""}Query on contributors {mx name=contributorstext}{mx -endif}

-defer Usage

The -defer element is simply a modifier for other elements. It keeps the RAL from evaluating an element immediately, and outputs the element as if it were plain text, except it leaves the -defer out. For example:

<option value=100{mx -defer name=_contributors match=100 true=selected}>Selection Item 100 will output

<option value=100{mx name=_contributors match=100true=selected}>Selection Item 100 the first time it is processed, and will this if that output is processed:

<option value=100selected>Selection Item 100

(This may leave the "selected" out, depending on the value of _contributors.)

One can have as many -defers as desired in an element— they do accumulate. That is, having three -defers in an element will cause it to defer evaluation until the fourth processing.

An Example Use of RAL

The following is an example of RAL used within an HTML file. A web CGI program that processes RAL can use this example file as a template, and fill in the RAL elements with the derived values of a query. This HTML has been simplified for the purpose of explanation, with comments in italics.

```
<HTML>
<HEAD>
<TITLE>
Bulletin Board
</TITLE>
</HEAD>
<BODY>
<h2><i>Bulletin Board </h2></i>
<form method="POST" action="/CGIBIN/result.exe">
<input type="submit" name="subaction" value="Refresh">
<input type="submit" name="subaction" value="Query">
<input type="submit" name="subaction" value="Summary">
<input type="submit" name="subaction" value="AM Notes">
```

Compare the total matching records to the maximum allowed in the display. If there are more, show the "change viewing mode" button.

```
{mx -if total > maximum}
  <input type="submit" name="subaction" value="{mx name=changeviewmode}">
{mx -endif}
<input type="submit" name="subaction" value="Long Form">
<input type="hidden" name="current" value="bboard"><br>
```

Display the total number of documents that matched, and how many will be displayed in this list.

```
<b>{mx name=docsshown}</b><br>
</form>
<PRE>
<B>Submit Company        Pgs Size Symbol    Syn Headline
</B>
<HR>
```

This part is a document enumeration. The enumeration shows the fields named 'updatedate', 'contributor', 'pagecount', 'bytecount', 'symbols', 'synopsis', and 'headline'. Around the 'synopsis' field, there is a use of the -if element, which decides whether to output a hypertext links to the synopsis. There is no -if element for the </A>, because an extra one doesn't hurt most browsers. (The following lines are split up with newlines to make it easier to read— running this HTML, it will not give the desired results.)

```
{mx start=documents}
{mx name=updatedate width=7}
{mx name=contributor width=20}
{mx name=pagecount width=3 align=right}
{mx name=bytecount width=4 align=right}
{mx name=symbols width=10}
{mx -if synopsis == 1}
```

```
<A HREF="result.exe?subaction={mx name=synfile}">
{mx -endif}
{mx name=synopsis width=3}</A>
<A HREF="result.exe?subaction={mx name=docfile}">{mx name=headline}</A>
{mx end=documents}</PRE>
<b>
```

Display the final counts.
```
{mx name=research}Research Documents<br>
{mx name=morningnotes}Morning Notes
{mx -if morningnotes >0}
—Click the "AM Notes" button to access them.
{mx -endif}
<br>
</b>
```

If there were more than a screenful of headlines displayed, create another form and display the control buttons again, just for the user's convenience.

```
{mx -if research > 17}
<hr>
<form method="POST" action="/CGIBIN/result.exe">
<input type="submit" name="subaction" value="Refresh">
<input type="submit" name="subaction" value="Query">
<input type="submit" name="subaction" value="Summary">
<input type="submit" name="subaction" value="AM Notes">
{mx -if total > maximum}
    <input type="submit" name="subaction" value="{mx name=changeviewmode}">
{mx -endif}
<input type="submit" name="subaction" value="Long Form">
<input type="hidden" name="current" value="bboard">
</form>
{mx -endif}
</BODY>
</HTML>
```

It will be appreciated that the templates and research access program described above are of general application, and can easily be modified to be used in many applications and fields. Accordingly, the templates and research access language should be understood as applicable to applications and fields other than for the distribution of research reports.

Step-by-Step Examples

The following are three step-by-step examples illustrating some of the principles discussed above. The first example describes what happens when the user first "logs in" from a non-secure "home pages" on the WWW, and receives a Bulletin Board display. The second example shows what happens when the user selects the "Query" button that is on the Bulletin Board display from the previous example. The third example illustrates what happens when the user makes a query.

According to the representative embodiment of the present invention, there are a number of predetermined types of information displays available. A bulletin board display outputs a list of the headlines of reports that have recently been received by the repository server 2. (In these examples, "recently received" is defined to mean reports that have been received that day, e.g., since midnight on today's date.). The bulletin board display can include the time of submission of the report by the contributor, the identity of the contributor, the number of pages and size of the report, ticket symbols related to the report, whether a synopsis is available and the headline, all displayed one line per report. A query results display comprises the same fields of information, but for reports that satisfy a user's query. Each of the above two types of output can be displayed in other formats, e.g., in long form which includes a two or more line output for each report listing the headline, the time of submission of the report by the contributor, the identity of the contributor (company), the name(s) of the authors of the report, the number of pages and size of the report, ticket symbols related to the report, whether a synopsis is available. A summary display outputs a three column table, each row listing a contributor, the number of research documents at the repository server 2 available for that user from that contributor and the number of morning notes at the repository server 2 available for that user from that contributor.

EXAMPLE 1

Logging In, and Getting a Bulletin Board

If a user has accessed an initial non-secure home page of the present invention, the user can select a link to "Log In". The actual link is to an address "/SCGIBIN/result.exe", where "result.exe" is the name of the CGI program that generates response pages to user actions. The directory /SCGIBIN is actually mapped on the non-secure web server to the directory /CGIBIN on the secure web server 4. This means that home pages are handled by the non-secure server, but actual access to reports is handled by the secure web server 4. When the secure web server 4 receives the request to run "result.exe", the web server 4 first checks the request to ensure that the Internet browser making the request is authorized to access the web server 4. If the Internet browser is not authorized, the web server 4 prompts the Internet browser to ask the user, via a dialog box, for a valid user ID and password.

In this example, the user enters the name "george@1984", and the password "wombat" and then selects OK. The web server 4 now verifies that the user is authorized. This is done by passing control to a subroutine named "mxp_auth( )" which consults the relational database's 11 list of valid users and their passwords. (In this example, the relational database 11 is an SQL server.) If the given user ID and password matches a database entry, the subroutine sets up the environment variables HTTP_CID as "1984" to represent the company ID of the user (taken from the "@1984" part of his ID), HTTP_UID as "2096" to represent the user's internal ID (taken from the SQL sever's records), and HTTP_MXP as "wombat" to represent the user's password. The subroutine then returns a REQ_PROCEED value, and the web server 4 knows it may then proceed handling the user's request to run "result.exe".

The web server 4 next executes the program "result.exe", with no additional arguments, because none were specified in the hypertext link to it, and because the page that the request was made from was not an HTML form, which would have named data fields the user could fill in to modify the request. First, "result.exe" verifies that the user is not attempting access with the same ID that another user is using. So "result.exe" retrieves the value of the environment variable "HTTP_COOKIE" which is provided by the web server 4 (from the HTTP "Cookie" value in the request from the Internet browser). "result.exe" attempts to find a value in the cookie named "mxauth". Since, in this example, this is the first time this user/browser has "logged in", the "mxauth" value in the cookie has not been set, so "result-.exe" grants this user access, generates an authorization string for this user, stores the string where it can find it later, and outputs a cookie value to the web server 4 that the server will send back to the Internet browser.

The next thing "result.exe" does is to determine what type of request the user made when calling "result.exe". Since there are no arguments to "result.exe", and there are no HTML form values, "result.exe" defaults to generating a Bulletin Board, which is a list of all headlines that have newly arrived at the repository server 2 today. The program has a choice of which type of database server to query for the list—the SQL server 11, and the full-text search server 13. Since this request does not require any full-text searching for values in documents, the "results.exe" program chooses to contact an SQL server 11. If the connection fails for some reason, the program will attempt to contact each backup SQL server until there are no more to connect to. The program will then fall back to attempting to contacting the full-text search servers 13 until it finds one that is up. Failure to find any available servers will result in generation of an error message, and termination of the program.

For the sake of this example, we will assume that "result-.exe" successfully connected to the SQL server 11. This particular request would have no parameters, except for specifying that only documents that have arrived on the SQL server 11 since midnight are desired. The request for the document headlines is immediately submitted to the SQL server 11, which returns its results asynchronously. This allows the SQL server 11 to begin processing the request, while "result.exe" moves on to its next step. This next step is to open an HTML template that is appropriate to the output requested by the user. In this case, "result.exe" is generating a simple Bulletin Board, so it is programmed to select a template named "BBOARDR?.tpl". The question mark in the name is filled in by the format that the user prefers his headlines to be displayed in. Possible formats are double line output (?='D'), list output (?='L'), and table output (?='T'). The formats that each user prefers are stored in the same place that the user's authorization code for the cookie is stored. The "result.exe" program goes to that storage area, looks up the preferred format for "george@1984", discovers it is "L", and finishes its template selection by opening the file "BBOARDRL.TPL". (Of course, other possible formats could be specified and used.)

The template file is mostly HTML, with some RAL elements mixed into it. The "result.exe" program will read through this template, and will immediately output any straight HTML to standard output, which the web server 4 will then send on to the Internet browser for the Internet browser to display as a page on the screen of the user's user computer 6, 8. However, the RAL elements will cause "result.exe" to insert various pieces of information into this stream of output at appropriate places, formatted according to the contents of the element. Show below is an annotated "BBOARDRL.TPL", indicating in italics what happens at certain RAL elements. (Note that, as above, elements begin with the characters "{mx".)

<HTML>
<HEAD>
<TITLE>
Bulletin Board
</TITLE>
</HEAD>
<BODY BGCOLOR="ffffff">
<nobr>
*The next line, though has an RAL element that gets its value from the initialization file that "result.xe", named "webpubl.ini". The dollar sign before "webserver" indicates that "result.exe" should look up the JNI entry named "webserver", and substitute its name here in the HTML.*
<h2><A HREF="{mx name=$webserver} /home/imagemap/mxnetlog.map">
<IMG SRC="/home/gif/mxnetlog.gif" BORDER=O ALT="Service Name"
ISMAP></A><i>
Bulletin Board
</h2></i>
</nobr>
<form method="POST"action="I/CGIBIN/result.exe">
<nobr>
<input type="submit" name="subaction" value="Refresh">
<input type="submit" name="subaction" value="Query">
<input type="submit" name="subaction" value="Summary">
<input type="submit" name="subaction" value="AM Notes">
*The next lines are conditional, depending on whether the "total" number of headlines returned from a headline list query is greater than the "maximum" number that "result-.exe" has been configured to display. When "result.exe" is confronted with resolving the value for "total", it first checks to see if it has that value yet. If not, it then goes into a waiting mode, while it waits for that value to arrive asynchronously from the database server 11, 13. Once the total arrives (which it does independently of the actual headline records), "result.exe" proceeds with evaluating this "if" condition. If the evaluation is false, then all text until the next "endif" is ignored.*
{mx -if total>maximum}
*In this example one, the total number of headlines returned is 143, while the value set for "maximum" is 100. So this condition is true, meaning the next line gets evaluated and sent out. The element named "changeviewmode" is intended to generate text for a button that the user can press to change from viewing only 100 headlines, to view all of them. So this element's value will become "View All 143".*
<input type="submit" name="subaction" value="{mx name=changeviewmode}">
{mx -endif}
<input type="submit" name="subaction" value="Long Form">
<input type="hidden" name="current" value="bboard">
*The next line has the element "docsshown". This evaluates to a phrase that tells the user what he is being shown. In this case, the element's value is "Latest 100 of 143 documents". These values depend on the total number of records, the maximum, and whether the user presses the "changeviewmode" button later, in which case it would show "143 documents".*
<br><font><b>{mx name=docsshown)</font></b><br>
</nobr>
</form>
<PRE>
<B>Submit Company Pgs Size Symbol Syn Headline</B>
*The next line actually does not contain any line breaks until the <IPRE>, but it is wrapped it here for clarity. The first element "{mx start=documents}" marks the beginning of a loop, causing "result.exe" to repeat this section through the "{mx end=documents)" as long as there are headline records in the result from the query. All the elements in* between are involved in displaying fields of the headline records, and in two cases, they are used to establish hypertext links to "result.exe" with arguments that display document synopsis and document contents. Of particular interest here, is that "result.exe" will access the headline records as they arrive asynchronously from the database server 11, 13, displaying them as soon as they arrive. The entire result set of the query does not have to be present for display to start, thus making the display to the user appear faster. In fact, the server is programmed to break the query to it up into pieces if sorting the results will be a lengthy process, as discussed above in the section titled "Optimizations". When a query is broken up, the most recent headlines are accessed first, which is the order that they are shown in this list. In addition, "result.exe" makes certain that the data is being sent to the server (and therefore to the user) by flushing its output queue every 5 headlines.

```
<HR>{mx start=documents}{mx name=updatedate width=
  7}{mx name=contributor width=20}{mx name=
  pagecount width=3 align=right}{mx name=bytecount
  width=4 align=right}{mx name=symbols width=10}{mx
  -if synopsis==1}<A HREF="result.exe?subaction={mx
  name=synfile)">(mx -endif)(mx name=synopsis width=
  3)</A><A HREF="result.exe?subaction={mx name=
  docfile)">{mx name=headline}</A>{mx end=
  documents}</PRE>
<b>
```

The next lines display counts of the documents, broken down by report type (e.g., here, research documents and morning notes.) Some of the output is conditional, depending on a zero value.

```
{mx name=research}Research Documents<br>
{mx name=morningnotes}Morning Notes
{mx -if morningnotes>0}
```
—Click the "AM Notes" button to access them.
```
{mx -endif}
<br>
</b>
```

It is convenient to have the action buttons also at the end of a long list of documents, but it looks unprofessional to have two sets of buttons with a short list of documents. So the next section that displays buttons is identical to the button display section above, except that it is conditional on how many research documents were actually displayed.

```
(mx-if research>17}
<hr>
<form method="POST" action="/CG1B1N/result.exe">
<nobr>
<input type="submit" name="subaction"
<input type="submit" name="subaction"
<input type="submit" name="subaction"
<input type="submit" name="subaction"
{mx -if total>maximum}
<input type="submit" name="subaction"
{mx -endif}
<input type="submit" name="subaction"value="Refresh">
value="Query">
value="Summary">
value="AM Notes">
value="{nm name=changeviewmode}">
value="Long Form">
<input type="hidden" name="current"
value="bboard">
</nobr>
</form>
{mx -endif}
```

```
</BODY>
</HTML>
```

The preceding example generates a page 100 for display on the user's Internet browser at the user's user computer 6, 8 as shown in FIG. 2. (The graphic listing the service name is not shown.)

The page 100, displayed in bulletin board format, includes a number of action buttons 120–130, and a list of reports. The action buttons 120–130 are all used as commands to "result.exe". Each report is listed on a single line, with information about the report including the time of submission of the report by the contributor (102), the identity of the contributor (104), the number of pages (106) and size of the report (108), ticket symbols related to the report (110), whether a synopsis is available (111) and the report's headline (112). The user can select (e.g., click on) a headline and have the complete report transferred from the repository server 2 to the user computer 6, 8. The user can select an entry in the synopsis column and have the synopsis displayed.

A refresh button 120, if selected, cause this same report to be regenerated, e.g., to include any new reports received since the this page 100 was generated. A query button 122, if selected, causes a query form to be generated, as explained in example 2 below. A summary button, if selected, causes a summary report to be generated. The summary report comprises a three column table, each row listing a contributor, the total number of research documents at the repository server 2 available for that user from that contributor and the total number of morning notes at the repository server 2 available for that user from that contributor. An AM Notes button 126, if selected, causes only morning notes to be displayed. A View All button 128, if selected, causes all headlines to be displayed, regardless of how many. A long form button 130, if selected, causes a page to be generated that includes a two lines for each report, listing the headline, the time of submission of the report by the contributor, the identity of the contributor (company), the name(s) of the authors of the report, the number of pages and size of the report, ticket symbols related to the report, whether a synopsis is available.

A summary line 132 shows the total number of documents that satisfy the query (in this case, all documents that arrived at the repository server 2 since midnight) and the total number displayed.

EXAMPLE 2

Requesting a Query Form

In the preceding example, the user "logged in" and was presented with a Bulletin Board. If the user wishes to make a query for documents that match certain criteria, he may then click the query button 122 on the Bulletin Board. This causes the Internet browser to form a request to the web server 4 to run "result.exe" again, but since the button is inside an HTML form, additional information is included in the request.

First, when the request arrives at the web server 4, the ID is verified in the same manner described in the prior example, except that the dialog box for user name and password is not displayed, since the Internet browser provides that information as part of the request. Once the user is verified, the web server 4 start running "result.exe", but with input that indicates the "Query" button was selected on the previous form.

The first thing "result.exe" does is to try to verify that the user is not attempting access with the same ID that another user is using. The "result.exe" program retrieves the value of the environment variable "HTTP_COOKIE" which is provided by the web server 2 (as received from the HTTP "Cookie" value in the request from the Internet browser). The "result.exe" program attempts to find a value in the cookie named "mxauth". Since this is NOT the first time this user/browser has logged in, the "mxauth" value in the cookie is set to the value "result.exe" gave this user last time he was authorized. The "result.exe" program compares this value to the current authorization code it has stored for this user, and if the two do not match, it generates output that tells the user that access has been denied. If the values do match, then "result.exe" proceeds.

By looking at the value for the CGI form variable "subaction", the "result.exe" program can determine that the user selected the query button 122 on his last request. At this point, the program selects an HTML template appropriate to this request, which is named "RESULTQ.TPL". To service a query form, "result.exe" connects to the appropriate database server 10, 13 as described in example one. Once connected, it then opens the HTML template, and starts generating output.

An annotated version of the "RESULTQ.TPL" template is shown below.
<html>
<head>
<title>Document Query </title>
</head>
<body BGCOLOR="#ffffff">
<nobr>
<h2><A HREF="{mx name=$webserver}/hcyme/ imagemap/mxnetlog.map"><IMG SRC=91/home/gif/ lmxnetlog.gif"BORDER=O ALT="Service Name" 1SMAP></A><i>
Document Query
</h2></i>
</nobr>
<nobr>
<form method="POST" action="/CG1B1N/result.exe">
Generate the buttons for commands to be executed from this form.

```
<input    type="submit"    name="subaction"    value="Submit">
<input    type="submit"    name="subaction"    value="Count Only">
<input    type="submit"    name="subaction"    value="Summary">
<input    type="submit"    name="subaction"    value="AM Notes">
<input    type="submit"    name="subaction"    value="Reset">
<input    type="submit"    name="subaction"    value="BBoard">
<input    type="hidden" name="current" value="query">
</nobr>
<table>
<tr    valign="top">
<td    width=90><b>Symbol:</b></td>
```

The element here is evaluating the value for "-ticker". Any element name that begins with an underscore is taken from values that are given to "result.exe" as input from the last form that started "resultexe". If the last form had afield (text, list box, hidden, or otherwise) named "ticker" (no underscore), then the web server 4 would start this instance of "result.exe" with an input field named "ticker" whose value would be the value in the "ticker" field in the last form. If the last form had a field named "ticker" with a value of "IBM", then this element will generate a default value for this input field of "IBM". This allows "result.exe" to come back to the previous state of this query form, if other forms remember the value for "ticker" in hidden fields.
<td><input type="text" name="ticker" value={mx name=-ticker quotes=1}></td>
<td width=86>
<td><input type="submit" name="subaction" value= "Symbol Guide"></td>
</tr>
</table>
<table>
<tr valign="top">
<td width=90><b>For Period Of: </b></td>

The following list box has one value preselected, due to the "match" and "true" parts in the elements within it. These elements evaluate the value for the field "date" from the last form, and if the value matches the value given for the "match" part, then the displayed value for the element will be contents of the "true" part of the element, in this case, the word "selected". In other words, for each one of these lines, you could read "If the last form's date field matches X, then display the word 'selected'". The special case for "Last 7 Days", where the match value is ",3", simply means that if the date value is either empty, or the number three, it is a match.

```
<td><select name="date">
<option value="0" {max name=__date march=O true=selected} >Today
<option value="1" {max name=__date march=1 true=selected} >Last 2 days
<option value="2" {max name=__date march=2 true=selected} >This Week
<option value="3" {max name=__date march=,3 true=selected} >Last 7 days
<option value="5" {max name=__date march=5 true=selected} >Last 14 days
<option value="7" {max name=__date march=7 true=selected} >This Month
<option value="8" {max name=__date march=8 true=selected} >Last 30 days
<option value="12" {max name=__date march=12 true=selected} >Last 60 Days
<option value="13" {max name=__date march=13 true=selected} >Last 90 Days
<option value="10" {max name=__date march=10 true=selected} >All Dates
<option value="-1">=================
</select></td>
</tr>
</table>
<table>
<tr>
</tr>
</table>
<table><tr valign="top"><td width=90><b>Keywords:</b></td>
```

Here, a default value for this field is based on the "query" field in the last form.

```
<td><input type="text" name="query" size=49 value={mx
    name=_query quotes=1}></td></tr>
</table>
<table>
<tr valign="top" ><td width=90><b>Contributors: </b
    ></td >
<td><SELECT NAME=contributors SIZE=6 MULTIPLE>
```

This is a possible default selection, the same as described above for "date."

```
<OPTION VALUE="-1" {mx name=-contributors match=
    ,-1 true=selected}>[All Contributors ]
```

This element marks the beginning of a loop on contributors. When this element is evaluated, "result.exe" forms a query to the server that will return a list of all document contributors (companies) that this particular user is entitled to read documents from. The request is asynchronous, so as each contributor record is returnedfrom the server, "request.exe" can fill in the inside of this loop. Inside the loop is an element that displays the ID number of the contributor, optionally followed by the word "selected" if it should be the default selection on this form, based on prior values of the form fields "contributors".

```
{mx start=contributorlist}
<OPTION VALUE={mx name=contributorid match=_contributors true="%s
selected" false="%s"}>{mx name=contributorname}
{mx end=contributorlist}
<OPTION
VALUE="2">=================================
============
</SELECT>
</td></tr>
<tr valign="top"><td><b>Industries:</b></td>
<td><SELECT NAMEmindustries SIZE=6 MULTIPLE>
<OPTION VALUE="-1" {mx name=_industries match=,-1 true=selected}>[All
Industries]
```

This element and the following loop is the same as the contributor loop above, except it lists the industries that the user may choose as selection criteria for documents, instead of contributors.

```
{mx start=industrylist}
<OPTION VALUE={mx name=industryid match=_industries true="%s selected"
false="%s"}>{mx name=industryname}
{mx end=industrylist}
<OPTION
VALUE="2">=================================
</SELECT>
</td></tr>
</table>
<hr>
```

These buttons are duplicates of the ones above—we found it was convenient to have them here too.

```
<input   type="submit"   name="subaction"   value="Submit">
<input   type="submit"   name="subaction"   value="Count Only">
<input   type="submit"   name="subaction"   value="Summary">
<input   type="submit"   name="subaction"   value="AM Notes">
<input   type="submit"   name="subaction"   value="Reset">
<input   type="submit"   name="subaction"   value="BBoard">
<input   type="hidden"   name="current"     value="query">
```

```
</form>
</body>
</html>
```

Figure 3:
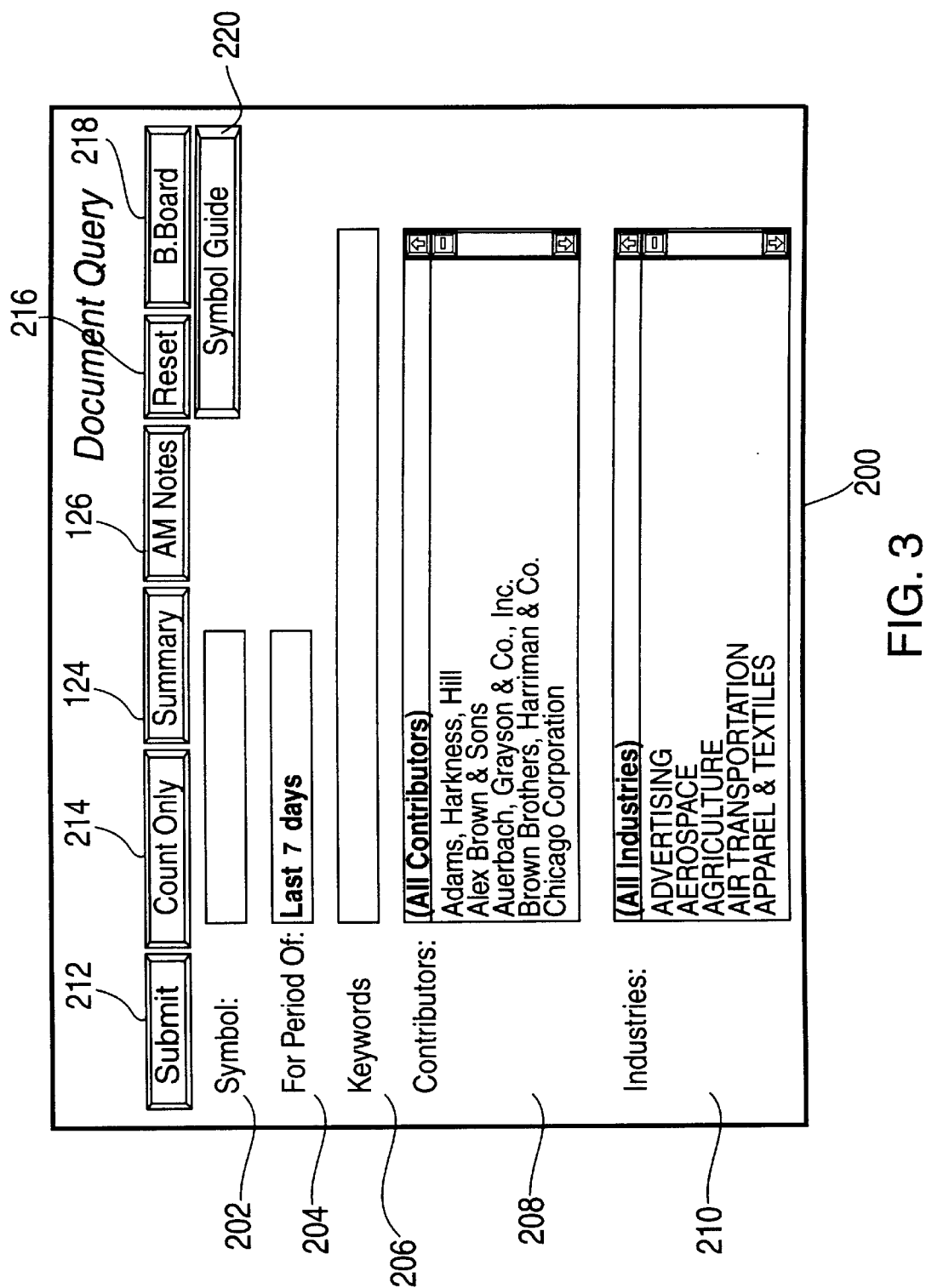
FIG. 3 is an example document query form screen display.

The preceding example generates a page 200 for display on the user's Internet browser at the user's user computer 6, 8 as shown in FIG. 3. (The graphic listing the service name is not shown.)

Using the document query page 200, the user can specify parameters for a search of reports located at the repository server 2. The user can specify one or more of the following parameters: symbol (202), period of time, from a drop down list box (204), keywords, and logical joins thereof (206), contributors (208), and industry groups (210). A symbol guide 220 is available if the user does not know a stocks ticker symbol, etc.

A partial list of the HTML generated for the contributors list box (208) is shown below:

```
<SELECT NAME=contributors SIZE=6 MULTIPLE>
<OPTION VALUE="-1" selected>[ All Contributors ]
<OPTION VALUE=42>Adams, Harkness & Hill
<OPTION VALUE=47>Alex Brown & Sons
<OPTION VALUE=128>Auerbach Grayson & Co., Inc.
<OPTION VALUE=53>Brown Brothers Harriman & Co.
<OPTION VALUE=109>Chicago Corporation
<OPTION VALUE=157>Closed End Fund Digest
```

-continued

```
<OPTION VALUE="-2">=======================
</SELECT>
```

A submit button 212 allows the user to submit the query, as discussed in detail in example three below. A count only button 214 allows the user to request a count of all documents available to that user that satisfy the query parameters. A reset button 216, if selected, clears the form. A BBoard button, if selected causes a bulletin board to be created for the user, as per the first example above.

EXAMPLE 3

The User Makes a Query

In the preceding example, the user requested a form from which he could make a query. This example will step through the user's actions, and the result it produces.

For this example, assume that the user has decided to select documents from Alex Brown & Sons, released over the last 30 days, that have the phrase "strong buy" in them. To do this, in the query form, the user selects the "Last 30 Days" item in the period of time combo box 204, enters "strong buy" (quotes included, to indicate a phrase instead of two independent words) in the keywords edit window 206, and selects "Alex Brown & Sons" in the contributors list box 208. To get the list of headlines that match this request, the user selects the submit button 212.

The request that goes to the web server 4 at this point is to run "result.exe" again, but there is additional information about date, keywords, and contributors in the request. Fields are also defined for industries and ticker symbols, but they are empty fields because the user did not specify anything for them. After the web server 4 verifies the user (as described above), it starts the "request.exe" program with these form fields as additional input.

The "request.exe" program determines from the input fields that a specific query is desired, and from the value of the "subaction" field (button 212) that the user wants a headline list, as opposed to a simple headline count, or a headline summary. The "request.exe" program selects the HTML template "RESULTRL.TPL", choosing the list format output (indicated by the "L" at the end of the file name) for just as it did for the first example. It constructs a headline query based upon the input fields for date, contributor, and keywords. It then submits the query to the full-text search server 13 (since there are keywords specified in the query). It then opens the HTML template, and fills in the elements from the result set of the query, in the same manner as for the Bulletin Board in the first example.

The resulting page 300 generated for display on the user's Internet browser at the user's user computer 6, 8 as shown in FIG. 4. (The graphic listing the service name is not shown.) The page is similar in many respects to that shown in FIG. 2. A score column 402 shows a relevancy score. The summary line 404 shows the total number of documents that satisfy the query, the total number displayed and query search parameters.

The user may then select a document by clicking on the document's headline. The document transfer process takes place as follows: The web server 4 issues a request to the relational database 11 asking whether the user is permitted to view the selected document. Assuming that the selected SQL server is available (if not, the backup procedure described above takes place), then the SQL server returns whether the use is so permitted. If the user is not permitted, then the web server 4 generates a HTML page using an error template. If the user is permitted, the requested document file is opened, the web server 4 generates the appropriate HTTP header and outputs it to STDOUT, and the document file is read and its contents is output to STDOUT. At the user computer 6, 8, the Internet browser program launches a helper application to allow the user to read, print and save the document.

Although the invention has been described with reference to a particular embodiment and arrangement of parts, features and the like, the above disclosure is not intended to exhaust or limit all possible embodiment, arrangements or features, and indeed, many other modifications and variations will be ascertainable to those skilled in the art.

Figure 5:
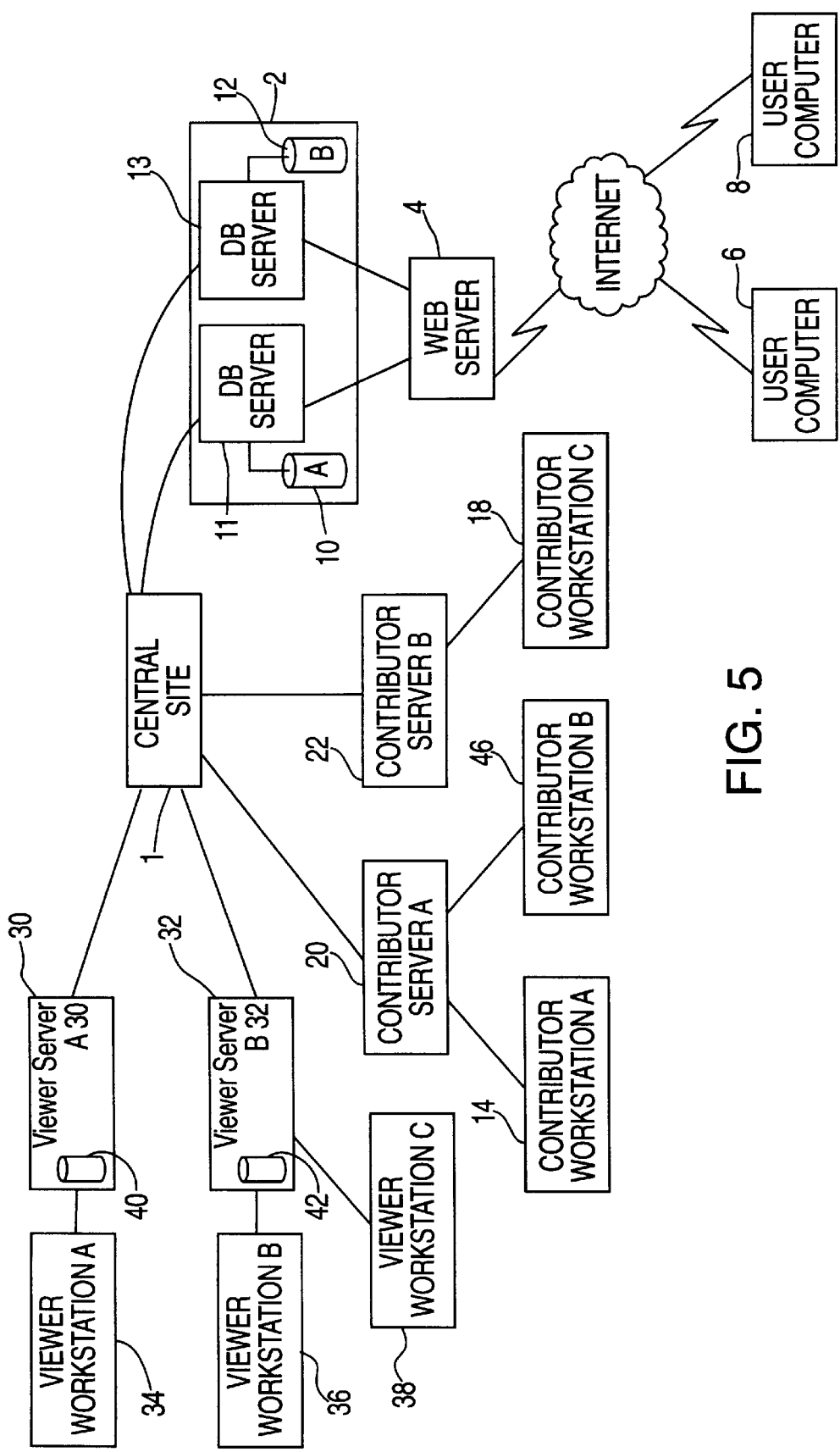
FIG. 5 is a system architecture diagram of an enhanced system according to the present invention.

For example, the central site 1 may distribute reports by other networks in addition to the Internet. FIG. 5 illustrates an enhanced system architecture according to the present invention. In the enhanced system, the central site 1 is also coupled to one or a number of viewer servers 30, 32. Typically, the viewer servers 30, 32 are located at a remote location with respect to the central site 1 and are coupled to the central site 1 over a proprietary network. Each viewer server 30, 32 includes a database 40, 42 and is coupled to one or a number of viewer workstations 34, 36, 38. The viewer workstations 34, 36 execute the Acrobat Exchange program, available from Adobe Systems, and the Multex Publisher™ Research Viewer program, by Multex Systems, Inc. The central site 1 maintains a distribution list that lists which viewer servers 30, 32 are permitted to receive reports from which contributors. (As a simple example, if viewer server A 30 is located at company ABC, Inc. and viewer server B 32 is located at company RST, Inc., then, for a particular report, the repository server may distribute the report to viewer server A 30 but not viewer server B 32.) When a report is received by the central site 1, the central site 1 transmits a task to each viewer server 30, 32 that is permitted to receive that report that a new report has arrived, and the permitted viewer servers 30, 32 executes the task to "pull" that report from the central site 1 and store it in their respective databases 40, 42. The viewer server 30, 32 will then cause the title of the report to be displayed on viewer workstations 34, 36, 38 that are used by investors who are permitted (as determined by the distribution level set by the contributor). Investors can also issue queries to the viewer server's database, which will return titles of relevant reports. The investor may then request a report, which is "pulled down" from the viewer server 30, 32 to the requesting viewer workstation 34, 36, 38.

It is noted that the web server 4 and repository server 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables reports and other information to be distributed speedily and searched efficiently by authorized users in remote locations.

A second enhanced embodiment of the present invention supports the creation of corporate information, provides access to corporate information, and controls access to corporate information. According to this embodiment, corporate information is acquired, indexed and updated.

Figure 6:
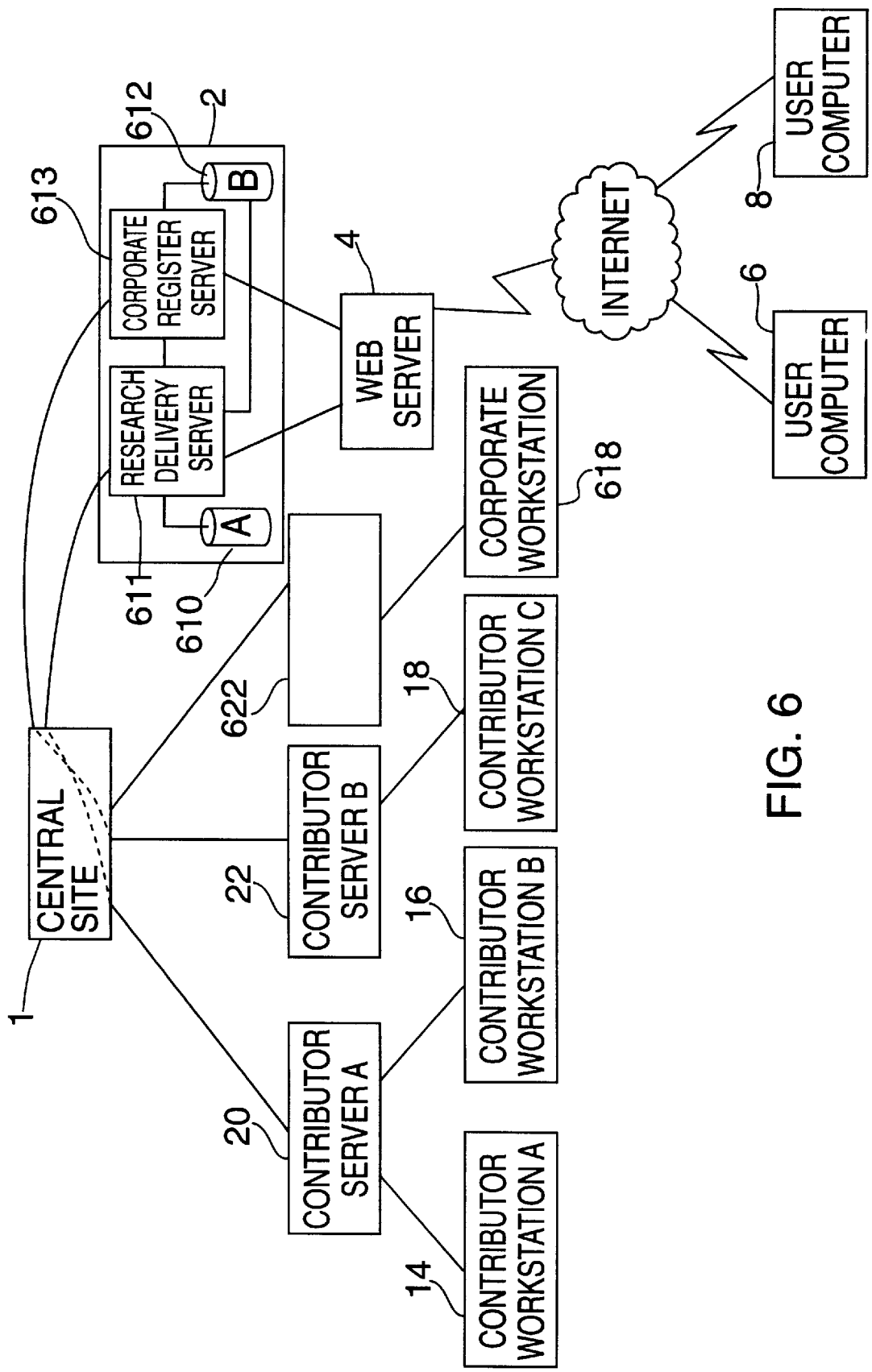
FIG. 6 is a system architecture diagram of a second enhanced embodiment according to the present invention.

FIG. 6 illustrates an overall system architecture according to the second enhanced embodiment of the present invention. In this embodiment, the repository server 2 further includes a corporate register server 613 (and corresponding database 612). Here, research delivery server 611, 610 represents a network of database servers including, for example, database servers 11 and 13 of FIG. 1.

The repository server 2 is coupled, via a central site 1, to one or more remote workstations (14, 16, and 18, described above in connection with FIG. 1) and further including corporation workstations 618. The corporation workstations 618 are used by corporations to submit corporation information to the repository server 2, as explained below. Optionally, the corporate workstations 618 are coupled to the repository server 2 via proprietary network comprising a plurality of contributor servers 622. Alternatively or additionally, a corporation workstation 618 may provide corporate information to the repository server 2 via the Internet.

For corporate information, the method of acquiring content from the corporations is as follows. The Network Administrator provides corporate templates to the corporation that specifies the required information. The corporate template may be provided electronically, for example via the contributor server 622 to the corporation workstation 618. At the corporation workstation 618 for example, the corporation fills in data on the corporate template, and submits the completed template to the central site 1, e.g., via 622.

At the central site 1, the reports and corporation information are processed. Typically, the central site comprises a network of computer processors.

The Network Administrator can provide editorial assistance and modifications of the completed corporate template for normalization, consistency and quality, and can assign graphical, visual, aural and other elements to editorialize the template. The corporation will then review and approve the final editorialized corporate template, The Network Administrator supplies WWW and research delivery system (e.g. MultexNet) hyperlinks to elements in the final editorialized corporate template. The Network Administrator assigns structured fields to the final editorialized corporate template. The final editorialized corporate template is contributed as pages on a corporate register server 613 and released for indexation. In the representative embodiment, the corporate information is formatted and stored according to HTML format. The process required to index content comprised in the corporate information is as follows. The system takes the bases URL of the final editorialized corporate template and links on that "site" are "crawled". Each page is text indexed and each text index is associated with the sub-URL of the page. Numerical data is indexed in tabular form. A structured index is built of the total "site". A media index is built of all media elements (e.g. visuals/aurals) and tabular elements.

It will be appreciated that the above editorial process adds value to the corporate information. For example, unlike existing Internet services that provide press releases to users, corporate press releases available according to the present invention have been formatted according to a standard format and relevant hypertext links have been added.

For each corporation that has an entry in the corporate register, the following information may be included:

1. A brief company profile providing the company's view of their industry, their competitive position, the attractions of their stock (e.g., strong record of dividend growth), strengths of their stock versus stock of peer group companies (e.g., higher yield), strategy, sources of growth, etc.

2. Updates that are typically mailed or blast faxed to analysts and portfolio managers on a regular basis—for example, quarterly post-earnings fax containing detailed financials and Q&A about the quarter.
3. Copies of slides from management presentations to buy and sell side.
4. Tapes (audio and/or video) of most recent post earnings or event-related conference call.
5. Any detailed information sent to analysts and portfolio managers in response to events (for example, detailed briefings on the impact of regulatory changes).
6. Annual reports and quarterlies.
7. Hot link to their web site.
8. 10-Ks, 10-Qs, proxy statements, 8 Ks and other regulatory documents.
9. Fact sheets and fact books.
10. Advertisements.
11. Press releases and other corporate announcements.
12. Prospectuses.
13. Rights plans.
14. Product and services brochures.
15. Announcements of upcoming events.
16. Newsletters.
17. Downloadable spreadsheets containing financial data on the corporation that can be manipulated by analysts.
18. Contact information and e-mail links.
19. Reprints of magazine or newspaper articles.

At the central site 1, each research report is converted into a predetermined format. In this second enhanced embodiment, all research reports received at the central site 1 from brokerage firms are converted at the central site 1 into a format that can be read by the Acrobat Exchange program, available from Adobe Systems, or any other report viewer/player application (e.g., .txt, .xls, .pps, etc.) The reports are then provided by the central site 1 to the repository server 2.

When desired, the repository server 2 can also receive, store, and enable the distribution of other useful information, such as, for example, news reports received from wire services, government reports, product reviews, etc.

The repository server 2 comprises or is coupled to at least two database servers 611, 613. Each database server is coupled to a database storage device 610, 612. A research delivery server and database 610, 611 stores and allows access to research reports received from brokerage firms. A corporate register server and database 612, 613 stores and allows access to corporate information received from participating corporations.

Figure 6A:
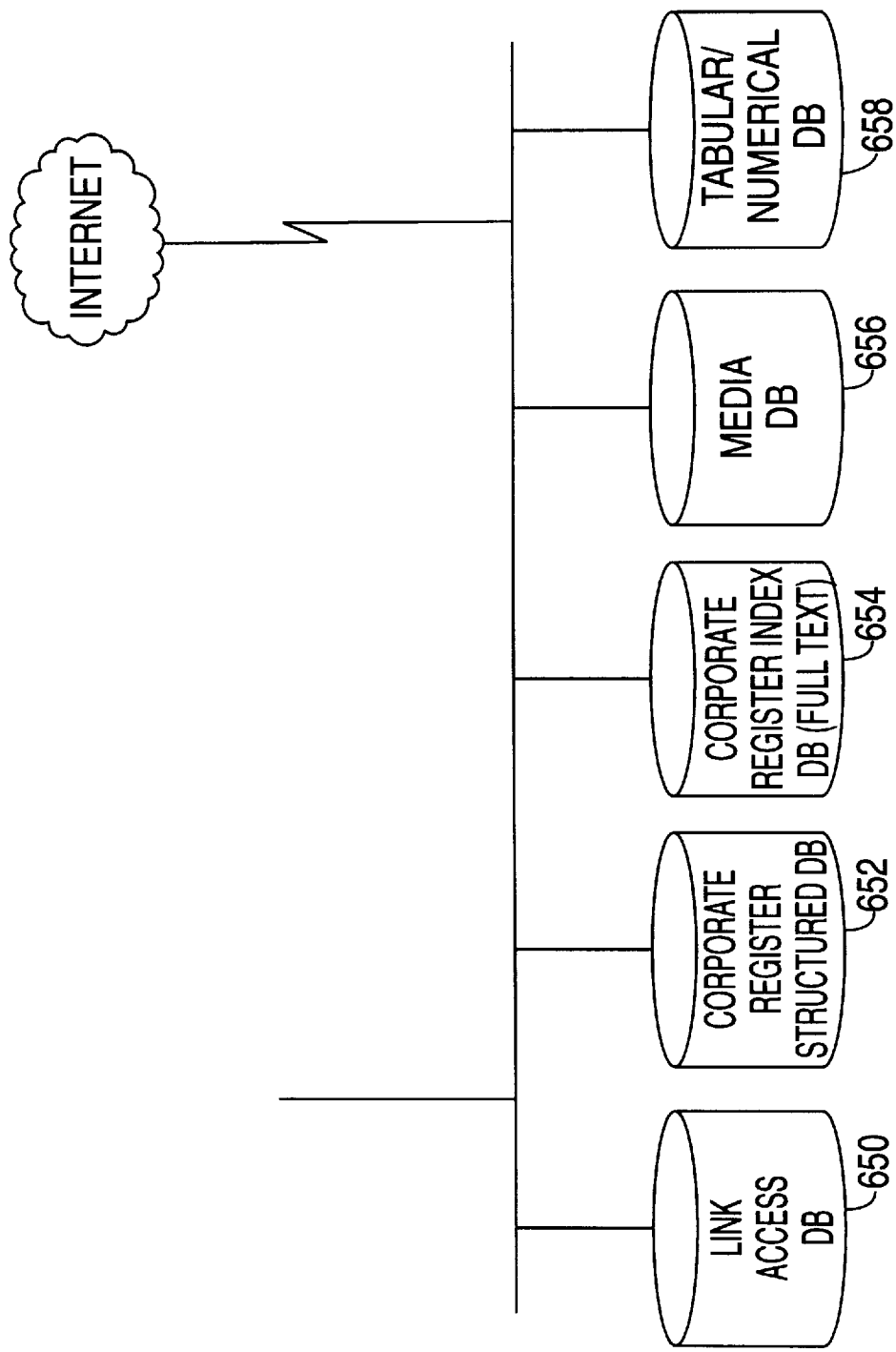
FIG. 6A is a diagram of a representative corporate register database system.

FIG. 6A shows in detail an example structure of the corporate register database 612. A link access database 650 (an SQL server) determines who is allowed to navigate web links and provides multiple routes on a single link. A corporate register structured database 652 (an SQL server) is an index that points to each element on the corporate register based on industry/ticker/personnel data/products/etc. A corporate register index database 654 is a full text index of the entire corporate register, e.g., all corporate information available (for example, a full text search engine available from Fulcrum of Ottawa, Canada). A media database 656 (an SQL server) stores all multimedia elements on all sites and indexes content based on MIME type. The media database 656 also stores indices to applications and non-static data contributed by corporations. A tabular/numerical database 658 (an SQL server) stores all numerical financial data on each corporation.

Full details of the research delivery server and database 610 and 611 is provided above in connection with database servers 11, 13 of FIG. 1. The research delivery server and database may also be configured as a single database engine, providing both full text searching capabilities as well as searching on predefined fields of information (thus combining the functionality of database servers 11 and 13).

The repository server 2 provides investors with lists of reports and corporate information received from the workstations 14, 16, 18, 618 and allows investors to request lists of reports and corporate information that fit certain criteria. The investor can select reports and corporate information from these lists to down-load, view and/or print. Generally, lists of reports and corporate information are generated by web server 4.

The contributor of a report or corporate information can be notified that a particular investor has accessed that report and item of corporate information. The repository server 2 maintains for each report and item of corporate information a list of those who accessed that report. The repository server 2 can transmit that list or a statistical summary of that list to preserve privacy to the contributor on a regular basis and/or when requested by the contributor.

The repository server 2 is coupled to a web server 4 which in turn is coupled to the Internet via, for example, a T1 or ISDN connection. The web server 4 is a high powered server computer that runs a web server program. In the representative embodiment, the web server 4 executes Netscape's Commerce Server program. The web server program allows web pages (in HTML format) to be accessed by investors. The web server 4 also executes other programs and subroutines as required.

Web Server: Like the web server 4 of FIG. 1, the web server 4 uses a single CGI program that handles all the types of requests that a user makes to the web server 4. In the representative embodiment, the types of requests that the CGI program can handle are:

Return a list of reports and items of corporate information recently received at the repository server 2.

Reformat the current list of reports.

Present a form that allows the user to specify criteria for reports and/or corporate information the user wants to access.

Return a list of reports and corporate information matching the criteria in the form mentioned above.

Return a list of reports and corporate information summarized by report contributor.

Return a list of reports authored by a specific contributor.

These requests are handled in the essentially the same way as described in connection with FIG. 1.

Authorization: In the representative embodiment, each user has authorization to access a subset of the information stored at the repository server 2. The contributor determines who has access to each report or item of corporate information. For example, corporation may designate that one of its briefings can be accessed only by its employees and certain investors. Another briefing may be designated as accessible by employees only. A third briefing may be released for general distribution to all who wish to access that briefing.

As described in connection with FIG. 1, every document contributed by a contributor is identified by a "contributor ID". Furthermore the document is assigned by the contributor to one or many "document groups" owned by the contributor. (Documents usually belong to one document group.)

The authorization information links an investor to a list of document groups. Each investor may be permitted to access documents in one, some or all document groups.

The repository server 2 constantly maintains an up to date list of all the report groups available. This list is updated in real time after a contributor changes an investor's entitlement status, a report is added, and is completely refreshed daily (e.g., after report removal of expired reports).

To submit a query, an investor must be identified by the repository server 2. As the investor's credential are checked (see above), the authorization information is retrieved by the repository server 2. This authorization information contains a list of report groups the investor is permitted to access.

Thus, in the representative embodiment, there is a database system 610, 611 for storing research reports produced by and received electronically from brokerage firms. Each research report has associated authorization information specifying who is authorized to access that research report. This authorization information may be stored with the corresponding report, or may be stored in a separate table, list, or database. Another database system 612, 613, called herein the corporate register, stores the corporate information. Each item of corporate information produced by and received from one of the plurality of corporations about itself. Each item of corporate information has associated with it authorization information specifying who is authorized to access that item of corporate information. The corporate register database system 612, 613 can also index and/or include corporate and other Internet web pages. (It will be appreciated that the present invention's architecture could easily be modified to include only one database system and storage device comprising many tables of information.)

At the user computer (e.g., 6 or 8) a research delivery user module enables users to access and search the research reports received from the brokerage firms. According to the present invention, searches conducted via the research delivery user module also (if desired and authorized) search and return items of corporate information from the corporate register.

The user computer can be thought of as having two user interfaces, namely a research delivery user module and a corporate register module. In fact, only one browser program is needed and executed by the user computer 6 -however, as the present invention creates two formats of results, it is convenient to consider the user computer 6 as utilizing two interface modules.

The research delivery user module presents information to the user as in a research information delivery system. According to the second enhanced embodiment of the present invention, there are a number of predetermined types of information displays available according to the research delivery user module. A bulletin board display outputs a list of the headlines of reports and items of corporate information that have recently been received by the repository server 2. (In these examples, "recently received" is defined to mean those that have been received that day, e.g., since midnight on today's date.). The bulletin board display can include the time of submission by the contributor, the identity of the contributor, the number of pages and size, ticker symbols related to the report or item of corporate information, whether a synopsis is available and the headline, all displayed one line per report. A query results display comprises the same fields of information, but for reports that satisfy a user's query. Each of the above two types of output can be displayed in other formats, e.g., in long form which includes a two or more line output for each report listing the headline, the time of submission of the report by the contributor, the identity of the contributor (company), the name(s) of the authors of the report, the number of pages and size of the report, ticker symbols related to the report/corporate information, whether a synopsis is available. A summary display outputs a three column table, each row listing a contributor, the number of research documents at the repository server 2 available for that user from that contributor and the number of morning notes at the repository server 2 available for that user from that contributor.

For example, as shown in FIG. 7, there is a bulletin board user interface 100 displaying recently received research reports that said user is authorized to access. Additionally, corporate information that the user is authorized to access can be displayed on the bulletin board.

As shown in FIG. 7, the page 100, displayed in bulletin board format, includes a number of action buttons 720–730, and a list of reports and items of corporate information. Each report and item of corporate information is listed on a single line, with information about it including the time of submission of the report by the contributor (702), the identity of the contributor (704), the number of pages (706) and size of the report (708), ticker symbols related to the report (710), whether a synopsis is available (711) and the report's headline (712). The user can select (e.g., click on) a headline and have the complete report transferred from the repository server 2 to the user computer 6, 8. The user can select an entry in the synopsis column and have the synopsis displayed.

A refresh button 720, if selected, cause this same report to be regenerated, e.g., to include any new reports and items of corporate information received since the this page 100 was generated. A query button 722, if selected, causes a query form to be generated. A summary button 724, if selected, causes a summary report to be generated. An AM Notes button 726, if selected, causes only morning notes to be displayed. A View All button 728, if selected, causes all headlines to be displayed, regardless of how many. A long form button 730, if selected, causes a page to be generated that includes a two lines for each report. A corp. register button 735, if selected, cause the research delivery system to be activated, e.g., cause the screen of FIG. 7 to be displayed.

A summary line 732 shows the total number of documents that satisfy the query (in this case, all documents and items of corporate information that arrived at the repository server 2 since midnight) and the total number displayed.

Similarly, using the research delivery user module a user can submit a query to the web server 4 and receive query results listing research reports (from 610, 611) and corporate information (from 612, 613) satisfying the query and that the user is authorized to access. The query results are displayed in a similar format to that shown in FIG. 7.

Figure 8:
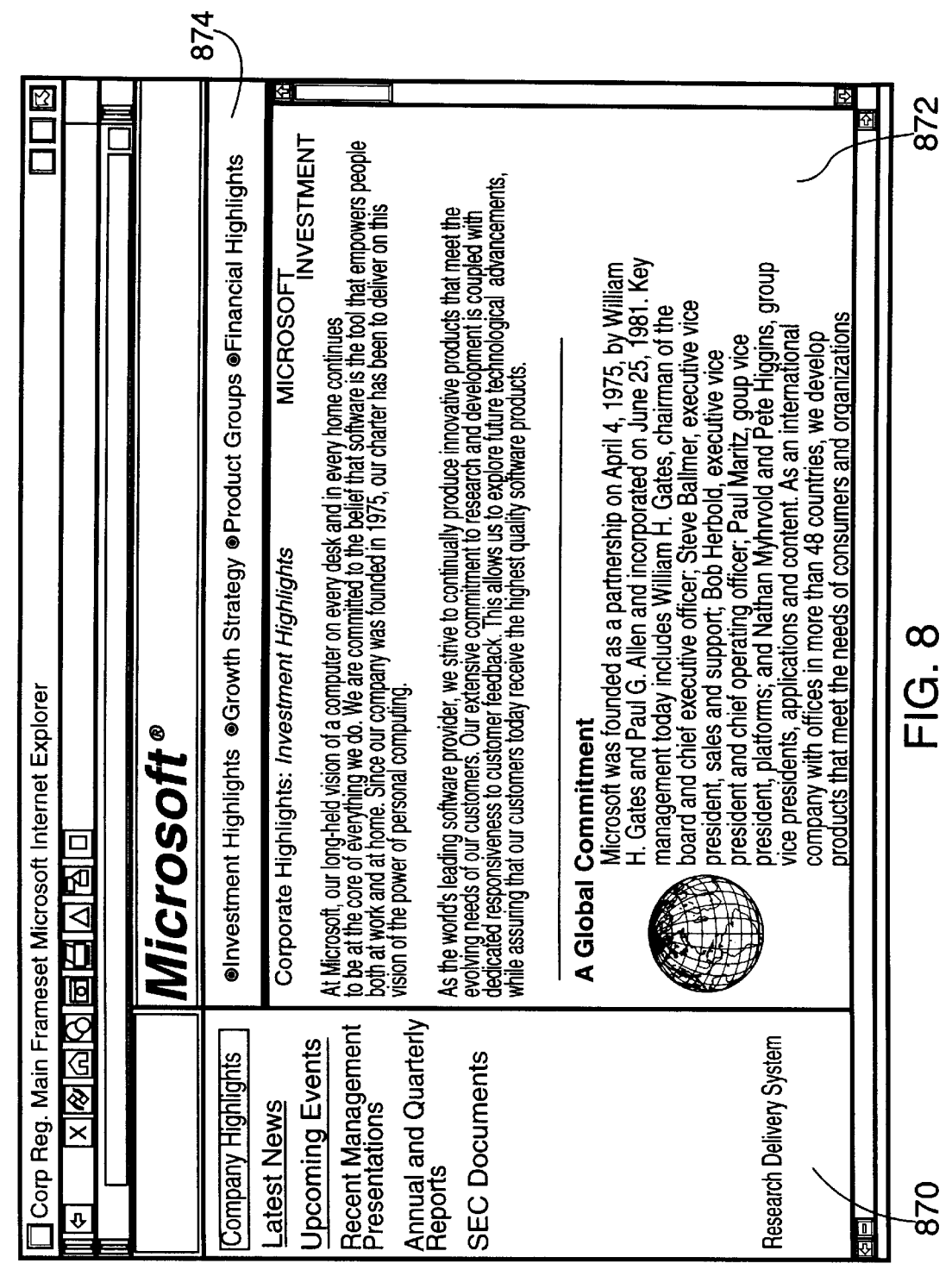

The corporate register module displays corporate information. Ideally, the corporate information for each corporation is displayed according to a common format. FIG. 8 shows an example page of corporate information.

In the representative embodiment, for example, the corporate information for each corporation is arranged in two frames, namely, an index frame 870 and a contents frame 872. The index frame 870 includes topic hyperlinks to various segments or types of the corporate information, e.g., "corporate highlights", "latest news", "upcoming events", "recent management presentations", "annual and quarterly reports", and "SEC documents". Ideally, the index frame 870 will have mostly the same entries for each corporation. The index frame 870 can be displayed at all times, e.g., in a frame shown in the browser.

The contents frame 872 includes the corporate information, arranged and navigatible according to the topics listed within the index frame. Again, for consistency, similar headings 874 in each topic can be used by each corporation. For example, the "corporate highlights" topic may include headings (as hyperlinks) for "investment highlights", "growth strategy", "product groups" and "financial highlights". Selecting a heading (274) will cause the corresponding corporate information to be retrieved and displayed in the contents frame.

The actual contents (e.g., the corporate information) and the format of the actual contents as displayed in the contents frame 872 is determined by the corporation itself. Thus, the "look and feel" of the actual contents may mirror the corporation's annual report and/or reflect the style, philosophy and vision of the corporation as seen by the corporation.

Generally, provision of corporate information over the Internet to the user computers 6, 8 utilizes common Internet addressing and transfer protocols.

In the representative embodiment, each hypertext link can be subject to user entitlements. For example, depending on a user entitlement, a hypertext link may have different meanings and link to different sites for different users. The corporation provides the actual links and entitlement/access rules to the Network Administrator. Links can be a straight gateway (link or don't link) or a variable gateway (choose link appropriate to user ID). The Network Administrator gives the corporation's link to a "proxy" link. The user selects the proxy link. The web server 4 accesses the link access database 650 and determines who the user is (either using technology known as D2 supplied by VeriSign or via ID/password query) and determines the appropriate actual link. The web server routes the user accordingly.

The present invention can create web pages "on the fly", according to a research access program. The research access program provides a mechanism that enables an investor to access the information in the databases 610, and 612 (via servers 611, and 613). The research access program also implements an Internet CGI, which accepts input parameters from HTML forms, and then using templates forms, generates HTML pages comprising information retrieved from the databases 611, 613. The template forms are written in a novel computer language, called herein a "research access language" (or RAL) that describes how to integrate the information retrieved from the databases 610, and 612 (via servers 611 and 613) into this form. The template forms include RAL elements, as discussed in detail in connection with FIGS. 1–4 above.

The present invention allows investors to submit queries and receive in response thereto a list of reports, items of corporate information and web sites that satisfy the queries. The queries are constructed from one or more search parameters, including: contributing company; which stock symbols figure prominently; when the item was published; what industries are featured; and keyword search parameters.

When using the research delivery system, an investor may enter search parameters at a user computer 6, 8 via a web page provided by the web server 4. When the investor selects the "submit" button on the web page, the search parameters are forwarded by the browser to the web server 4. The search parameters are used to form a query. The query is submitted to the appropriate server 611 or 613 and a list of matching documents is generated. This list is formatted on the web server 4 into HTML form, and sent to the investor at the user computer 6, 8, where the investor's browser displays the list to the investor.

Entitlement/Report Subsystem: As noted above, each participating corporation or research provider (collectively "contributors") may dynamically authorize ("entitle") and de-authorize ("disentitle") users to access selected individual documents, document groups, and hypertext links. Additionally, contributors may download reports regarding entitlements and document and/or hypertext link usage. In accordance with the present invention, each such capability is provided by an on-line real time entitlement/report subsystem.

Figure 9:
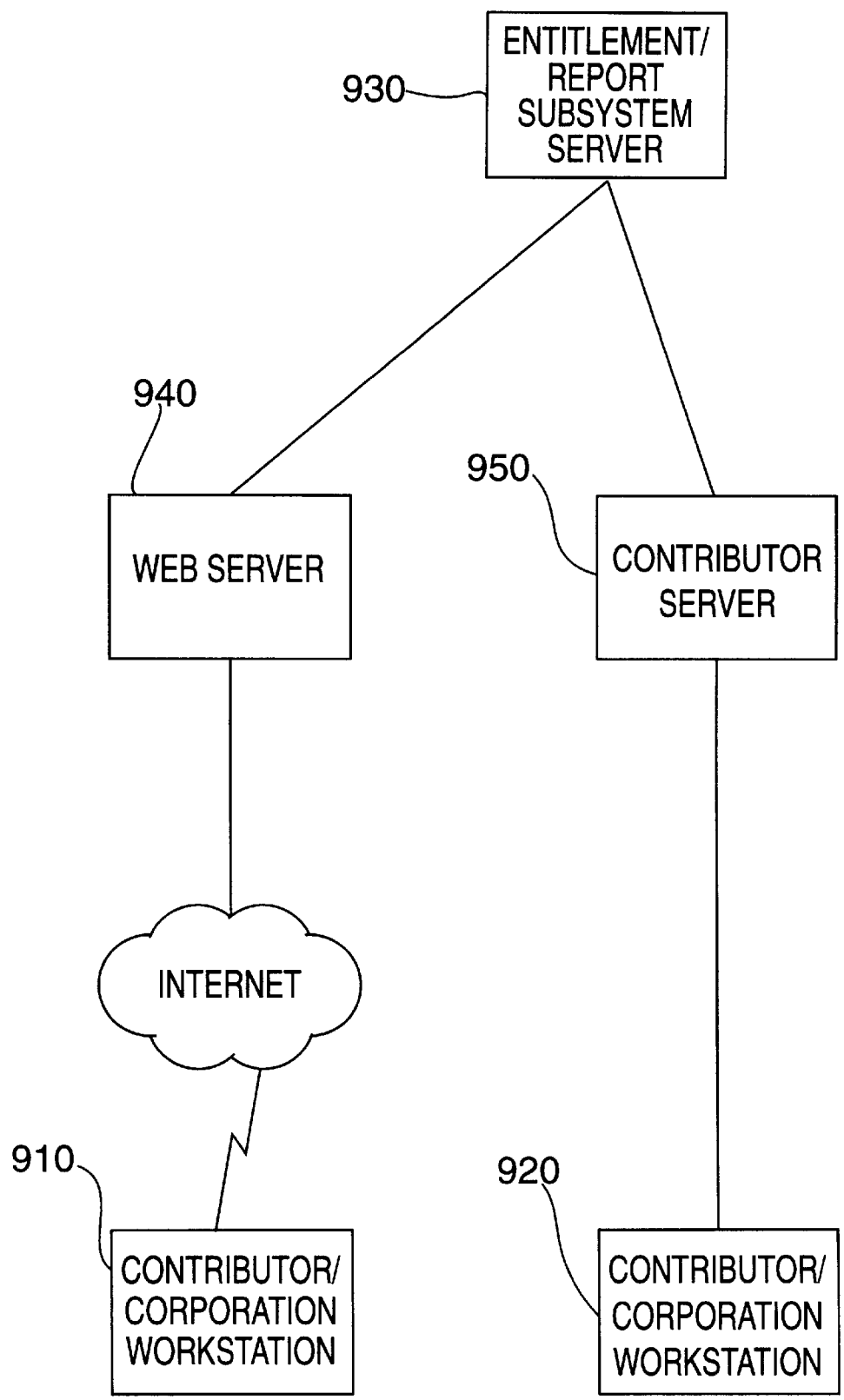
FIG. 9 illustrates one embodiment of an on-line entitlement/report subsystem.

Referring to FIG. 9, contributor/corporation workstations 910, 920 (typically located at a site remote from the repository server 2) are selectively coupled to an entitlement/report subsystem server 930 via, for example, a Web server 940 (over the Internet) or over a proprietary network through a contributor server 950. The subsystem server 930 is additionally in communication with the respository server 2 of FIGS. 1 and 6 (not shown in this figure).

Once workstations 910, 920 are connected to the subsystem server 930, the subsystem server 930 prompts the contributors (at the corresponding workstations 910, 920) to log-in with an ID and password. In the exemplary embodiment, the ID and password are verified by the subsystem server 930 (e.g., in the manner described above in connection with user verification).

After the contributor has logged in, the subsystem server 930 presents the contributor (via the Internet as a web page or via a proprietary network) with an initial menu. An example of such a menu is illustrated in FIG. 10. As shown, the contributor may chose to create a report by clicking (i.e., selecting with an input device such as a mouse) "Reports" 1010 or chose to review and/or modify user (subscriber) entitlement status by clicking "Entitlements" 1020.

Figure 11:
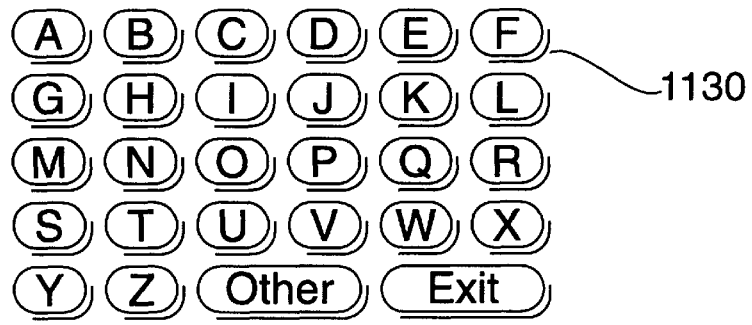
FIG. 11 is an example of a subscriber selection criteria page (for entitlement status viewing/modification).

If the contributor selects "Entitlements" 1020, the subsystem server 930 presents the contributor with a selection page having a drop down box (1110), an input box (1120), and a number of action buttons (1130–1160) as illustrated in FIG. 11. Using this page, the contributor identifies to the subsystem server 930 the criteria for selecting subscribers whose entitlement status the contributor wishes to review and/or modify.

The contributor first identifies what document group (or possibly what hypertext link) the contributor wishes to work with. Clicking on button 1110 causes a drop down box (not shown) to appear listing document groups (associated with that particular contributor) from which the particular contributor may chose. The list may include, for example:

Public—identifying public type documents;
Internal—identifying contributor internal documents; or
Technical—identifying technical documents.

Alternatively, the list may include individual document titles or hypertext link names. As illustrated, a document group "Multex Tech Doc" has been selected.

Next, the contributor may chose to display the entitlement status for subscribers by letter or may chose to display the status of all subscribers for the last 15 days (1140), 30 days (1150) or 60 days (1160). Specifically, if the contributor wishes to display subscribers by letter, the contributor may, for example display all new subscribers, i.e., new within the last N number of days (default is ALL days) whose names start with a particular letter of the alphabet. In that case, the contributor fills in the number of days (N) in the input box 1120 and clicks a lettered action button 1130. The contributor may click on "Other" to display subscribers whose names begin with non-alphabetic characters (such as, for example, 3Com).

Alternatively, the contributor may display all new subscribers, i.e., new within the last 15, 30, or 60 days, by clicking "15 days" 1140, "30 days" 1150, or "60 days" 1160 (respectively).

In response to a contributor's selection of an action button (1130, 1140, 1150, 1160), the subsystem server 930 queries the repository server 2 for a list of subscribers meeting the selected criteria. The resulting list is transmitted to the subsystem server 930 for display to the contributor.

Figure 12:
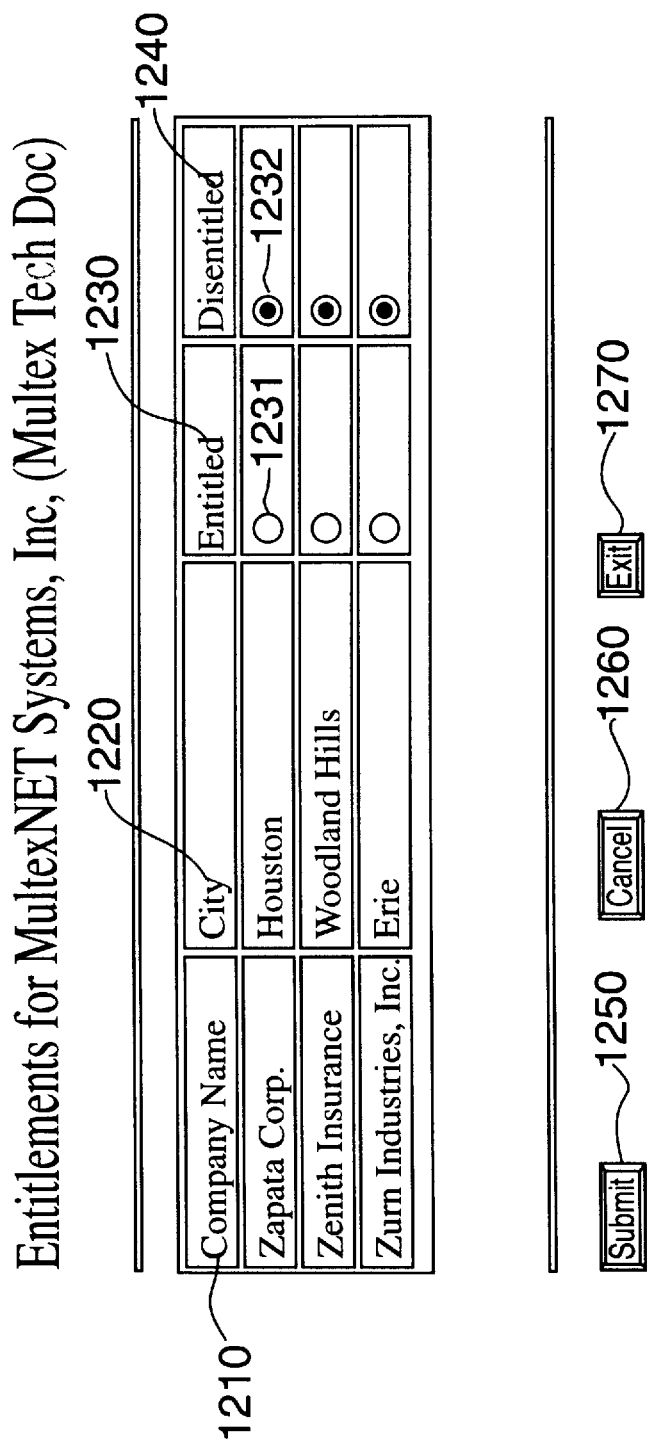
FIG. 12 is an example of an entitlement status viewing/modification page.

FIG. 12 illustrates one exemplary subscriber list. Here, the contributor selected: i)"Multex Tec Doc" document group; ii) new subscribers within the last 15 days; and iii) the letter "Z." As illustrated, information for each subscriber is listed on a single line and includes the subscriber name 1210, the subscriber's city 1220, and whether the subscriber is currently entitled 1230 (or disentitled 1240) to access documents within the selected document group (here, Multex Tec Doc group). In this case, all of the listed subscribers are "disentitled" or prohibited from accessing documents in the selected document group (the "disentitled" circle of each subscriber is filled in).

To modify entitlement status, the contributor clicks either the circle 1231 below "Entitled" 1230—filling in the "entitled" circle (if the subscriber is currently "disentitled") or clicks the circle 1232 below "Disentitled" 1240—filling in the "disentitled" circle (if the subscriber is currently "entitled") corresponding to the appropriate subscriber. The contributor submits the changes to the subsystem server 930 by clicking the "Submit" action button 1250. Clicking on the "cancel" action button 1260 cancels the operation. The contributor may then return to the initial menu (FIG. 10) by clicking the "exit" action button 1270.

The subsystem server 930 transmits the submitted changes to the repository server 2 where the changes are processed and the authorization lists appropriately updated. In the exemplary embodiment, the submitted changes are implemented in real time. However, in an alternate embodiment, the submitted changes may be implemented in batch-mode, for example, at night.

It is contemplated that, in most cases, a particular contributor will be permitted to view and modify entitlement status only with respect to documents and document groups associated with (or contributed by) that particular contributor (during login procedures, the contributor identifies himself or herself with the ID and password). However, it is also possible that contributors will be permitted to view and modify entitlement status with respect to documents and document groups associated with related contributors or contributors who have authorized such viewing and/or modification.

Particular subscribers or subscriber groups may have a default entitlement status for particular documents or document groups. Specifically, all subscribers may initially be "entitled" to access documents within the "Public" document group. However, perhaps only contributor's employees are initially "entitled" to access the contributor's internal documents while all other subscribers may be "disentitled."

In one embodiment, contributors may set the entitlement status of subscribers to one setting for a predetermined period of time. After the expiration of that time, the entitlement status of some or all of the subscribers may automatically change. For example, a contributor may wish to initially "entitle" a small subset of subscribers —and "disentitle" everyone else—for 30 days, for a particular document or document group. The document or document group may contain information that is only sensitive for a certain length of time. After the expiration of the 30 days, however, the contributor may wish to have the entitlement status of some or all of the "disentitled" subscribers to change to "entitled."

If the contributor wishes to create and download reports, the contributor selects "Reports" 1020 from the initial menu (FIG. 10). As a result of a "Reports" selection, the subsystem server 930 displays to the contributor a report parameter selection page (FIG. 13). Using this page, the contributor identifies to the subsystem server 930 the type of report, which month's data to analyze, and what format the report should be in.

As the result of selecting button 1310, a drop down box 1311 is displayed, listing the types of reports from which the contributor may chose. Here, the contributor may chose "Usage" (usage reports were described above) or "Entitlements." Other reports are, of course, possible.

Entitlement reports provide information such as users/subscribers entitlement status for each document group, each individual document, and/or each hypertext link.

In this representative embodiment, the contributor also selects which month's data should be analyzed for the report by typing a month in the input box 1320. Here, if the contributor types "12/96" into the input box 1320, the data for the month of December, 1996 is analyzed.

Finally, the contributor selects the format of the report to be downloaded to the contributor's workstation 910, 920. Clicking button 1330 results in the display of a drop down box (not shown) listing the possible report formats. The formats may include, for example, Excel 5.0, WordPerfect 6.1, Microsoft Word, etc. Other report formats are possible. Here, Excel 5.0 has been selected as the report format.

The contributor submits the report parameters to the subsystem server 930 by clicking on the "Download" button. Once the subsystem server 930 receives the parameters, the subsystem server 930 transmits the parameters to repository server 2 in the form of a query. The repository server 2 processes the query and transmits the results back to the subsystem server 930 for downloading (in real time) to the contributor's workstation 910, 920 in the selected format.

Although, for ease of description, the report/entitlements subsystem has been described in terms of an on-line combined subsystem for report functions and for entitlement status viewing/modification functions, it will be understood that each such function may be provided (if at all) by a separate subsystem—a report subsystem for reports and an entitlement subsystem for entitlement status viewing/modification. Such functions may also be performed in a batch-mode.

Other embodiments: Although the invention has been described with reference to a particular embodiment and arrangement of parts, features and the like, the above disclosure is not intended to exhaust or limit all possible embodiment, arrangements or features, and indeed, many other modifications and variations will be ascertainable to those skilled in the art. For example, the repository server 2 may distribute reports by other networks in addition to the Internet. It is noted that the web server 4 and repository server 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables reports and other information to be distributed speedily and searched efficiently by authorized users in remote locations.

As another example of the broad application of the present invention, the corporate register of the present invention could be implemented and/or integrated with non-Internet delivery mechanisms, such as, for example, intranets, proprietary networks (e.g., Multex Publisher, Bloomberg, Reuters Broker Research), and the like. Thus, references to research delivery systems and research delivery module should be understood to include such other delivery mechanisms.

Thus, the above described embodiments are merely illustrative of the principles of the present invention. Other embodiments of the present invention will be apparent to those skilled in the art without departing from the spirit and scope of the present invention.

What is claimed is:

1. An integrated computer-implemented information delivery system, comprising:
   a first database for storing research reports produced by and received electronically from brokerage firms, each research report having associated authorization information specifying who is authorized to access the research report;
   a second database for storing a plurality of corporate information about a plurality of corporations, each item of corporate information produced by and received from one of the plurality of corporations about said corporation, each item of corporate information having associated authorization information specifying who is authorized to access the item of corporate information;
   a research delivery module coupled to the first database and the second database, the research delivery module having a bulletin board user interface displaying to a user recently received research reports that said user is authorized to access and corporate information and having a query user interface allowing a user to submit a query and receive query results listing research reports and corporate information satisfying the query and that the user is authorized to access;
   a corporate register module coupled to the second database for outputting corporate information, the corporate information output for display according to a common format; and
   an on-line entitlement subsystem coupled to the first database for selecting at least one research report associated with a particular brokerage firm from the plurality of research reports as electronically specified by the particular brokerage firm and for modifying in real time the authorization information associated with the at least one selected research report in accordance with instructions electronically provided by the particular brokerage firm from a remote location.

2. The system of claim 1 wherein the entitlement subsystem is coupled to the second database, the entitlement subsystem additionally for selecting at least one item of corporate information associated with a particular corporation from the plurality of corporate information as electronically specified by the particular corporation and for modifying in real time the authorization information associated with the at least one selected item of corporate information in accordance with instructions electronically provided by the particular corporation.

3. The system of claim 2 wherein the corporate information is formatted according to a hypertext markup language and includes hypertext links to related information.

4. The system of claim 2 wherein the corporate information is formatted according to a hypertext markup language and when displayed in the corporate register module includes hypertext links to said corporation's Internet site.

5. The system of claim 1 wherein the research reports are formatted according to a page description format.

6. The system of claim 1 wherein the research delivery module includes a display module for reading and displaying documents in a page description format.

7. The system of claim 1 wherein the query results are selectable hyperlinks causing a selected research report to be displayed according to the research delivery module and causing a selected item of corporate information to be displayed according to the corporate register module.

8. The system of claim 1 further comprising:

an on-line report subsystem, connected to the first database, for selecting at least one research report associated with a particular brokerage firm from the plurality of research reports as electronically specified by the particular brokerage firm and for generating a report listing at least some of the authorization information associated with the at least one selected research report in accordance with instructions electronically provided by the particular brokerage firm.

9. The system of claim 8 wherein the on-line report subsystem is further connected to the second database, the report subsystem additionally for selecting at least one item of corporate information associated with a particular corporation from the plurality of corporate information as electronically specified by the particular corporation and for generating a report listing at least some of the authorization information associated with the at least one selected item of corporate information in accordance with instructions electronically provided by the particular corporation.

10. An integrated computer-implemented corporate information delivery system, comprising:

a database for storing (a) a plurality of research reports produced by and received electronically from brokerage firms, each of the research reports having associated authorization information specifying who is authorized to access the research report, and (b) a plurality of corporate information about a plurality of corporations, each item of corporate information produced by and received electronically from one of the plurality of corporations about said corporation, each item of corporate information having associated authorization information specifying who is authorized to access the item of corporate information;

a research delivery module coupled to the database, the research delivery module allowing a user to submit a query and receive query results listing research reports and corporate information satisfying the query and that the user is authorized to access;

a corporate register module coupled to the database for outputting corporate information, the corporate information output according to a common format; and an on-line entitlement subsystem coupled to the database for selecting at least one research report associated with a particular brokerage firm from the plurality of research reports as specified by the particular brokerage firm and for modifying the authorization information associated with the at least one selected research report in accordance with instructions provided electronically by the particular brokerage firm from a remote location.

11. The system of claim 10 wherein the entitlement subsystem is additionally for selecting at least one item of corporate information associated with a particular corporation from the plurality of corporation information as specified by the particular corporation and for modifying the authorization information associated with the at least one selected item of corporate information in accordance with instructions electronically provided by the particular corporation.

12. The system of claim 11 wherein the corporate information is formatted according to a hypertext markup language and includes hypertext links to related information.

13. The system of claim 11 wherein the corporate information is formatted according to a hypertext markup language and when displayed according to the corporate register module include s hypertext links to said corporation's Internet site.

14. The system of claim 13 wherein the research reports are formatted according to a page description format.

15. The system of claim 14 wherein the research delivery module includes a display module for reading and displaying research documents in a page description format.

16. The system of claim 10 wherein the query results are selectable hyperlinks when selected by a user causing a selected research report to be displayed according to the research delivery module and causing a selected item of corporate information to be displayed according to the corporate register module.

17. The system of claim 16 wherein the corporate register module includes a hypertext link to the research delivery module.

18. A system for dynamically creating hypertext links in hypertext pages based upon an entitlement of a user accessing the hypertext page, comprising:

a database of entitlement information specifying entitlements of a plurality of users;

a hypertext page in electronic form, the hypertext page including at least one specification of an entitlable hypertext link, the entitlable hypertext link specifying a plurality of possible links as a function of entitlement information;

an on-line entitlement subsystem, connected to the database of entitlement information, for modifying entitlements of at least one of the plurality of users in real time in accordance with instructions provided electronically from a remote workstation;

a browser for displaying the hypertext page at a user computer;

a server for receiving a request for a second hypertext page from a user upon selection of the entitlable hypertext link by the user;

means for obtaining a user identification for the user;

means for determining the entitlements of the user as a function of the user identification by accessing the database of entitlement information;

means for routing the user to a second hypertext page according to the entitlement information and one of the plurality of possible links.

19. A method for the electronic distribution of corporate information and research reports in a timely, reliable and secure manner, comprising the steps of:

electronically receiving research reports produced by a plurality of brokerage firms including authorization information specifying who is authorized to access each of said research reports;

storing the research reports and authorization information in a database;

electronically receiving at least one entitlement modification instruction from a particular brokerage firm of the plurality of brokerage firms;

modifying the authorization information associated with at least one research report associated with the particular brokerage firm in accordance with the received at least one entitlement modification instruction; and receiving items of corporate information about a plurality of corporations, each item of corporate information produced by a corporation about said corporation and associated with authorization information specifying who is authorized to access said item of corporate information;

storing the items of corporate information in the database;

receiving a query from a user; and outputting query results to the query listing research reports and items of corporate information satisfying the query and that the user is authorized to access.

20. The method of claim 19 further comprising the steps of:

enabling the user to select an item of corporation information;

accessing the database to obtain the selected item of corporate information; and outputting the selected item of corporate information.

21. The method of claim 20 wherein the step of outputting the selected item of corporate information further comprises the step of displaying the item of corporation information according to a common format.

22. The method of claim 19 wherein the step of storing the items of corporate information further comprises the step of storing the items of corporate information formatted according to a hypertext markup language and includes hypertext links to related information.

23. The method of claim 19 further comprising the steps of:

electronically receiving at least one entitlement modification from a particular corporation of the plurality of corporations; and modifying the authorization information associated with at least one item of corporation information associated with the particular corporation in accordance with the at least one entitlement modification instruction received from the particular corporation.

* * * * *

UNITED STATES PATENT AND TRADEMARK OFFICE
CERTIFICATE OF CORRECTION

PATENT NO. : 5,864,871
DATED : January 26, 1999
INVENTOR(S) : Eduard Kitain et al It is certified that error appears in the above-identified patent and that said Letters Patent is hereby corrected as shown below:

Column 15, line 36, change "or iginal," to read -- original --;

Column 23, line 54, change "'% s'," to read -- '%s' --;

Column 25, line 21, change "'% s'," to read -- '%s' --;

Column 34, line 63, change "<IPRE>," to read -- </PRE>--;

Column 38, in the list box, change "max," to read -- mx --;

Column 38, in the list box, change "march," to read -- match --;

Column 38, line 16, change "afield," to read -- a field --; and

Column 54, line 4, change "include s," to read -- includes --.

Signed and Sealed this

Ninth Day of May, 2000

Attest:

Q. TODD DICKINSON

Attesting Officer          Director of Patents and Trademarks